United States Patent [19]
Hirata et al.

[11] Patent Number: 5,430,851
[45] Date of Patent: Jul. 4, 1995

[54] APPARATUS FOR SIMULTANEOUSLY SCHEDULING INSTRUCTION FROM PLURAL INSTRUCTION STREAMS INTO PLURAL INSTRUCTION EXECUTION UNITS

[75] Inventors: Hiroaki Hirata, Kyoto; Akio Nishimura, Osaka, both of Japan

[73] Assignee: Matsushita Electric Industrial Co., Ltd., Osaka, Japan

[21] Appl. No.: 893,466

[22] Filed: Jun. 4, 1992

[30] Foreign Application Priority Data

Jun. 6, 1991 [JP] Japan .................................. 3-134882

[51] Int. Cl.⁶ .............................................. G06F 9/38
[52] U.S. Cl. ................................ 395/375; 364/DIG. 1
[58] Field of Search ........................ 395/375, 650, 775

[56] References Cited

U.S. PATENT DOCUMENTS

| | | | |
|---|---|---|---|
| 3,771,138 | 11/1973 | Celtruda et al. | 395/375 |
| 4,807,115 | 2/1989 | Torng | 395/375 |
| 4,847,755 | 7/1989 | Morrison et al. | 395/650 |
| 4,903,196 | 2/1990 | Pomeane et al. | 395/375 |
| 4,916,652 | 4/1990 | Schwarz et al. | 395/375 |
| 4,969,117 | 11/1990 | Miranker | 395/650 |
| 5,185,868 | 2/1993 | Tran | 395/375 |

OTHER PUBLICATIONS

MC88100 RISC Microprocessor User's Manual, Motorola 1990.
SPARC RISC User's Guide, Ross Technology, Inc. A Cypress Semiconductor Company, 1990.
Am29000 Streamlined Instruction Processor User's Manual, Advanced Micro Devices, 1987.

*Primary Examiner*—Parshotam S. Lall
*Assistant Examiner*—Richard Ellis
*Attorney, Agent, or Firm*—Price, Gess & Ubell

[57] ABSTRACT

Disclosed is an information processor comprising multiple instruction setup units which fetch and decode instructions as the first half of the procedure in instruction pipelines, each of the instruction setup units being in charge of processing instruction streams. The decoded results are scheduled in instruction schedule units and sent to each corresponding function unit to be executed.

46 Claims, 17 Drawing Sheets

APPARATUS FOR SIMULTANEOUSLY SCHEDULING INSTRUCTION FROM PLURAL INSTRUCTION STREAMS INTO PLURAL INSTRUCTION EXECUTION UNITS

BACKGROUND OF THE INVENTION (1) Field of the Invention

This invention relates to an information processor which increases the utilization of functional units, by issuing multiple instructions from different instruction streams in parallel and to an instruction scheduler used for the information processor.

(2) Description of the Related Art

Recently, higher-and-higher-speed execution of instructions in information processors is being pursued by processing them in parallel. The architectural definition of the current general-purpose computers implies sequential execution of instructions, that is, any instruction being executed after the execution of the immediately preceding instruction is completed.

Some years ago, the designers of high-performance sequential machines already knew that concurrent execution of instructions could improve the performance of the machines. First tried on this line was the pipelining (parallelization) of instruction process. However, inter-instruction dependencies (for example, the information input of an instruction is generated by executing the immediately preceding instruction) prevent these primary pipelined machines from achieving up to the upper limit performance that one instruction is executed per cycle. However, this problem has been almost solved by the advent of the Reduced Instruction Set Computer (RISC) processor, whose number of instructions to be executed per cycle is almost 1, which is close to the limit of high speed. MIPS R2000/3000 is an example of the pipelined high-performance RISC processor. However, since it is impossible to depend only on the pipelining technique to realize further improvement of the performance, the designers have provided more arithmetic units, by which multiple instructions have been issued per cycle. Such improvement of the performance costs additional amount of hardware including not only more functional units but also more complicated control in order to keep logical sequence of instruction execution demanded by the architecture. Intel 80960CA is the first commercial microprocessor employing such a superscalar (multi-instruction issue) technique.

However, there is also a limitation to improve the performance of the processors by employing such a technique. It is said that only two or three instructions could be issued in parallel because the inter-instruction dependencies are not thoroughly eliminated, taking normal application into account. (refer to "Nikkei electronics" 487 issue p.191-200)

DESCRIPTION OF THE CONVENTIONAL EXAMPLE

One example of the above mentioned conventional pipelined processors is described as follows with reference to FIG. 1.

In FIG. 1 showing the abstract construction of a conventional information processor, there are an instruction fetch unit 11, a decode unit 21, and a dependency analysis unit 22. Function execution units 23, 24, and 25 are referred to as an integer operation unit, a floating-point operation unit, and a load/store unit respectively in this example. Usually provided general registers and other units are not illustrated.

The operation of the information processor having above construction is described as follows.

The instruction pipeline of the hardware shown in FIG. 1 includes three essential phases of instruction execution: to fetch, decode, and execute instructions. The instruction fetch unit 11 reads an instruction outputted either from a memory or a cache, stores it into a given local instruction register, and performs various address calculations for instruction access. The decode unit 21 decodes each instruction and issues operational directive to the function execution unit corresponding to the type of the instruction. The dependency analysis unit 22 memorizes and manages which register the instruction uses as a source or a destination. This unit 22 required to control logical interlocks among instructions caused by data dependencies, may be included in the decode units 21. Each of the function execution units 23-25 is in charge of the execution phase in instruction pipelines.

The following is a detailed description of the operation of the decode units 21.

The decode unit 21, when received a branch instruction from the instruction fetch unit 11, orders the unit 11 to handle instruction address. On the other hand, the decode unit 21, when received an arithmetic or load/store instruction, first detects the existence of data dependencies based on the information received from the dependency analysis unit 22. In such a dependency analysis, 1-bit flags are often provided for each register. After the analysis, issuable instructions are sent to each corresponding function execution unit, and the information of dependency analysis is updated to reserve for the destination register. On the other hand, non-issuable instructions remain pending until the data dependencies have been solved.

The decode unit 21 controlling the functions of the function execution units, is informed of the solution of the dependencies through the information of dependency analysis updated on the completion of execution or write-back to the register.

In the case of the superscalar processor, the decode unit 21 carries out such dependency analysis of multiple instructions simultaneously, checks the occurrence of conflicts over the function execution units among the types of instructions, and issues issuable instructions in parallel, if any, to function execution units.

However, the information processor having the above-mentioned construction has following drawbacks.

Only one instruction stream is utilized for instruction execution, in which pipeline interlocks are caused by dependency among instructions. This prevents each functional unit from operating with high utilization, and consequently from obtaining high throughput in processing performance.

SUMMARY OF THE INVENTION

The main object of this invention, therefore, to provide an information processor having functional units each of which achieves high utilization and high throughput, and an instruction scheduler used for it.

Another object of this invention is to provide a rational information processor capable of executing instructions of multiple instruction streams in parallel, and an instruction scheduler used for it.

Another object of this invention is to provide the excellent information processor capable of effectively sharing resources among multiple instruction streams in the latter half of the execution phase of instructions.

The above objects are attained by an information processor processing instructions of a plurality of instruction streams in parallel, comprising multiple instruction setup units, a plurality of function execution units, and an instruction schedule unit disposed between the instruction setup units and the function execution units, wherein each of the instruction setup units reads and decodes instructions from one of different instruction streams, and judges whether the instructions are issuable or not based on the information of data dependencies sent from the function execution units. The instruction schedule unit preferably has a device for receiving the decoded instructions from the instruction setup units, selecting issuable instructions among them for the function execution units in the state of capable of receiving instructions among the function execution units, and outputting the selected ones to each corresponding function execution unit. The function execution units preferably have a device for executing instructions received from the instruction schedule unit and a device for reporting the information of dependency elimination to the instruction setup unit which issued the instructions, when the execution is finished.

Each of the instruction setup units may comprise an instruction fetch device for reading instructions from one of different instruction streams, a dependency analysis device for analyzing and storing the information of data dependencies received from the function execution units, and a decoding device for decoding the instructions read by the instruction fetch device and judging whether the instructions are issuable or not based on the information of the data dependencies, wherein each of the instruction fetch device reads instructions from each of different instruction streams in parallel in a reading cycle.

The above objects can be attained also by an instruction scheduler for executing instructions of multiple instruction streams in parallel in a plurality of execution the instruction scheduler units comprising a plurality of instruction input units for receiving the input of instructions by requesting the outside to input them, a plurality of instruction output units for outputting instructions upon the request of the outside, an instruction selection unit for selecting the instructions to be outputted at each of the instruction output units among the inputted multiple instructions, wherein the instruction selection unit comprises a selecting device for selecting instructions based on the priorities assigned to each of the instruction input units, and a priority reassigning device for rotating the assigned priorities in every processor cycle. Various other priory schemes are possible without departing from the present invention.

According to the above construction, each unit of the information processor of this invention operates efficiently because multiple instructions issued in parallel are not obtained from a single instruction stream but selected from different instruction streams free from data dependencies.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

Figure 2A:
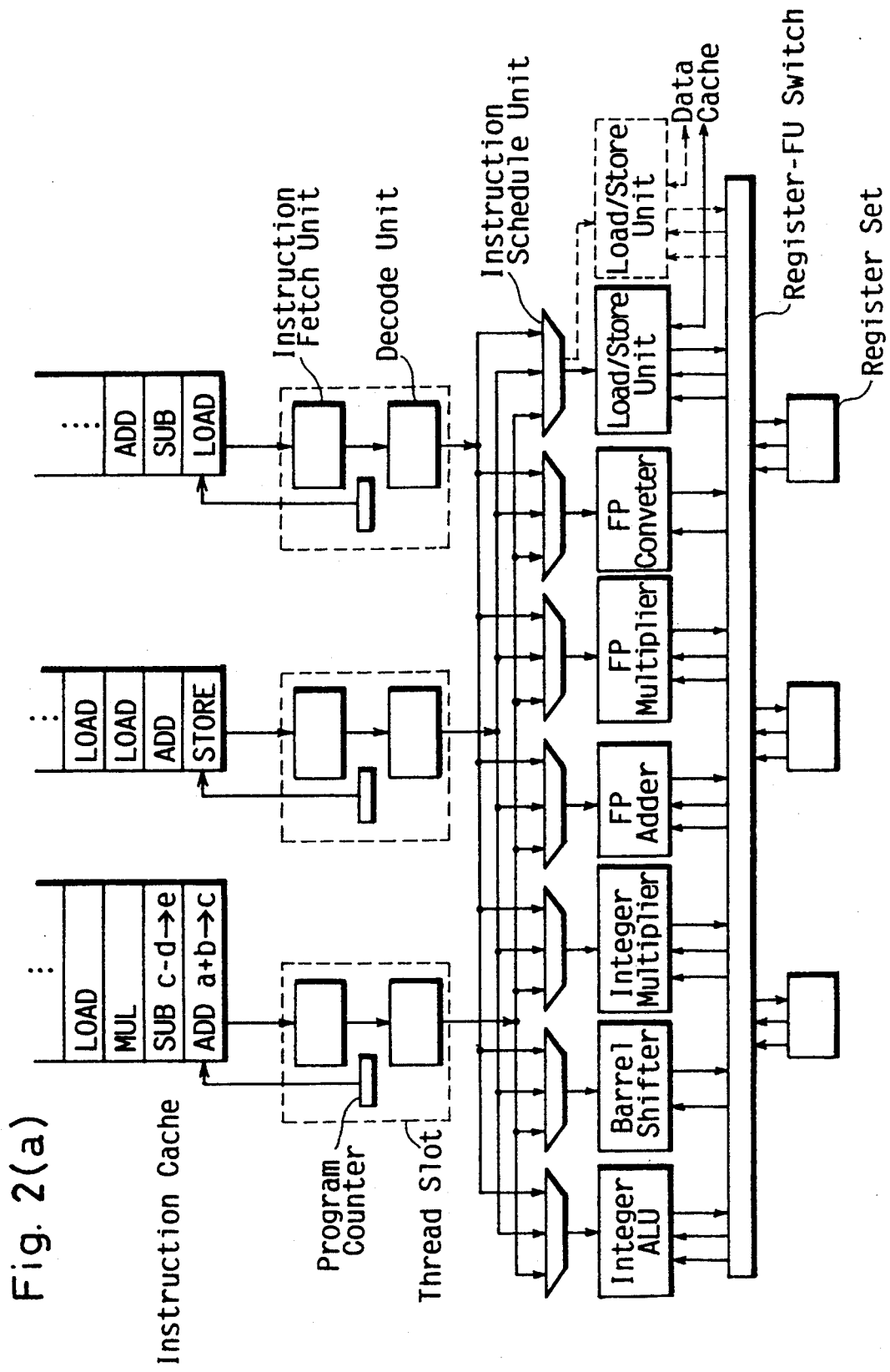
FIG. 2(a)/(b) show constructions of different embodiments of an information processor of the present invention.

The processor shown in FIG. 2(a) comprises three instruction setup units fetching and decoding instructions, seven different instruction execution units, instruction schedule units scheduling the instructions decoded in the instruction setup units, register sets holding data of each instruction stream, which is processed such as calculation by the instruction execution units, and a register FU switch connecting the register sets with the instruction execution units in order to transfer the data held in the register set to the instruction execution unit designated by the scheduling, and in order to store the executed data into the destination register.

Each of the instruction setup units is connected with an unillustrated instruction cache, and fetches instructions indicated by a program counter one by one per cycle from each of instruction streams $I_1$, $I_2$, and $I_3$ held in the instruction cache to decode them. Here, each of the instruction streams is independent of the others. This invention, according to which instructions of three independent instruction streams are executed in parallel, is distinguished from the superscalar technique according to which instructions of one instruction stream are executed in parallel.

The instruction schedule units whose detailed construction is described later in each embodiment, are required to execute instructions of three independent instruction streams in parallel using common instruction execution units.

Figure 2B:
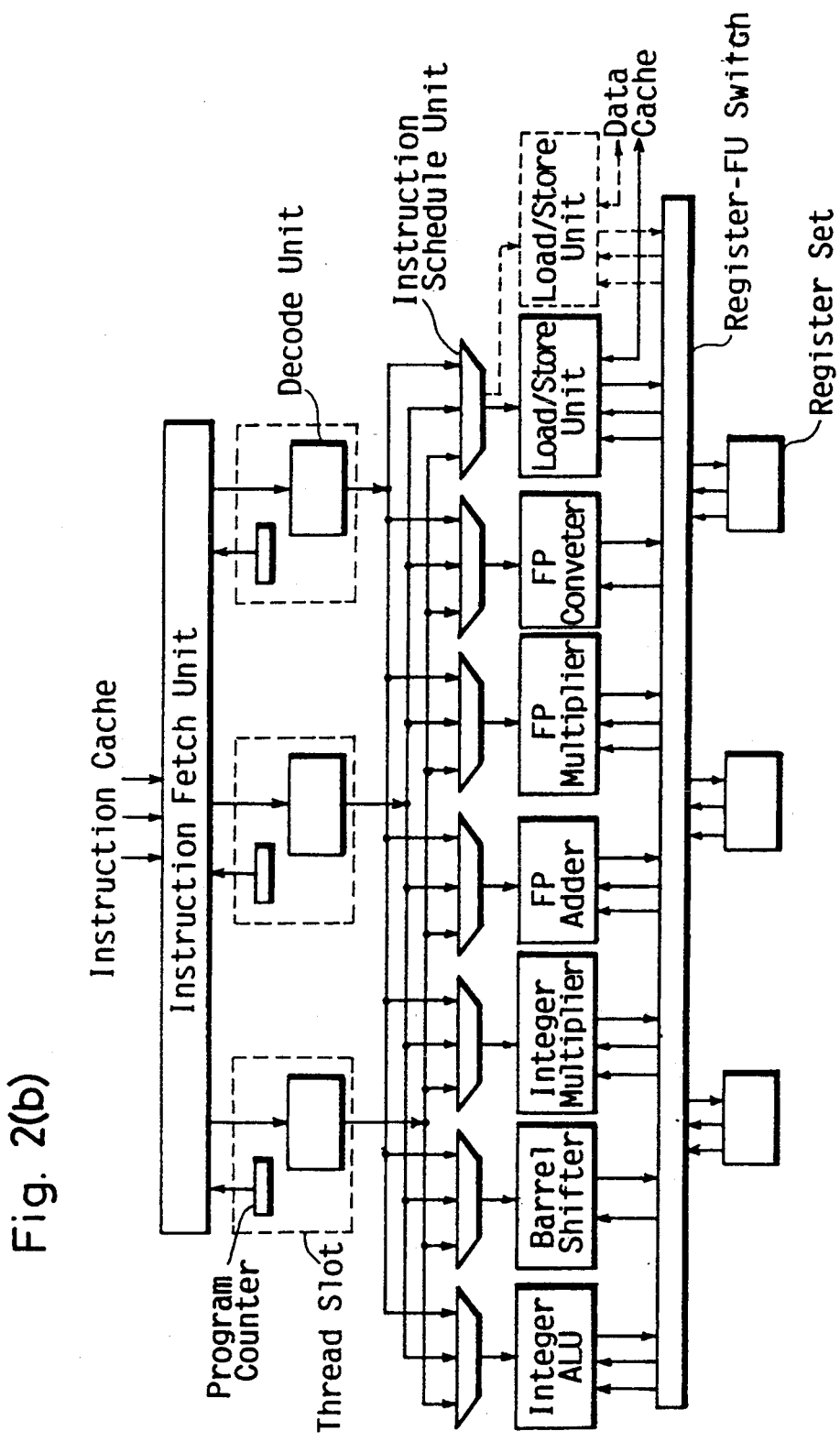

The information processor shown in FIG. 2(b) differs from that of FIG. 2(a) in the construction of from instruction caches to instruction setup units. According to the example shown in FIG. 2(a), each instruction setup unit has a instruction fetch unit so that each instruction fetch unit fetches instructions of independent instruction streams per cycle. On the other hand, according to this example, three instruction setup units share a single instruction fetch unit by fetching three instructions from an instruction stream to deliver to an instruction setup unit in the first cycle and fetching three other instructions from another instruction stream to deliver to another instruction setup unit in the next cycle. Since each of the instruction setup units processes one instruction per cycle, they are provided with unillustrated queue to hold instructions for 3 cycles temporarily in this example.

A further precise description of this invention with reference to FIG. 3 onward is as below. In these figures, registers which hold data to be processed in the function execution units are not illustrated and the construction of control system only is shown. Also, the numbers of instruction setup units and function execution units are different from those in FIG. 2(a)/(b) for the convenience of description. Furthermore, it should be noted that each instruction setup unit is provided with an instruction fetch device, but the units may be designed to share one such device.

Figure 3:
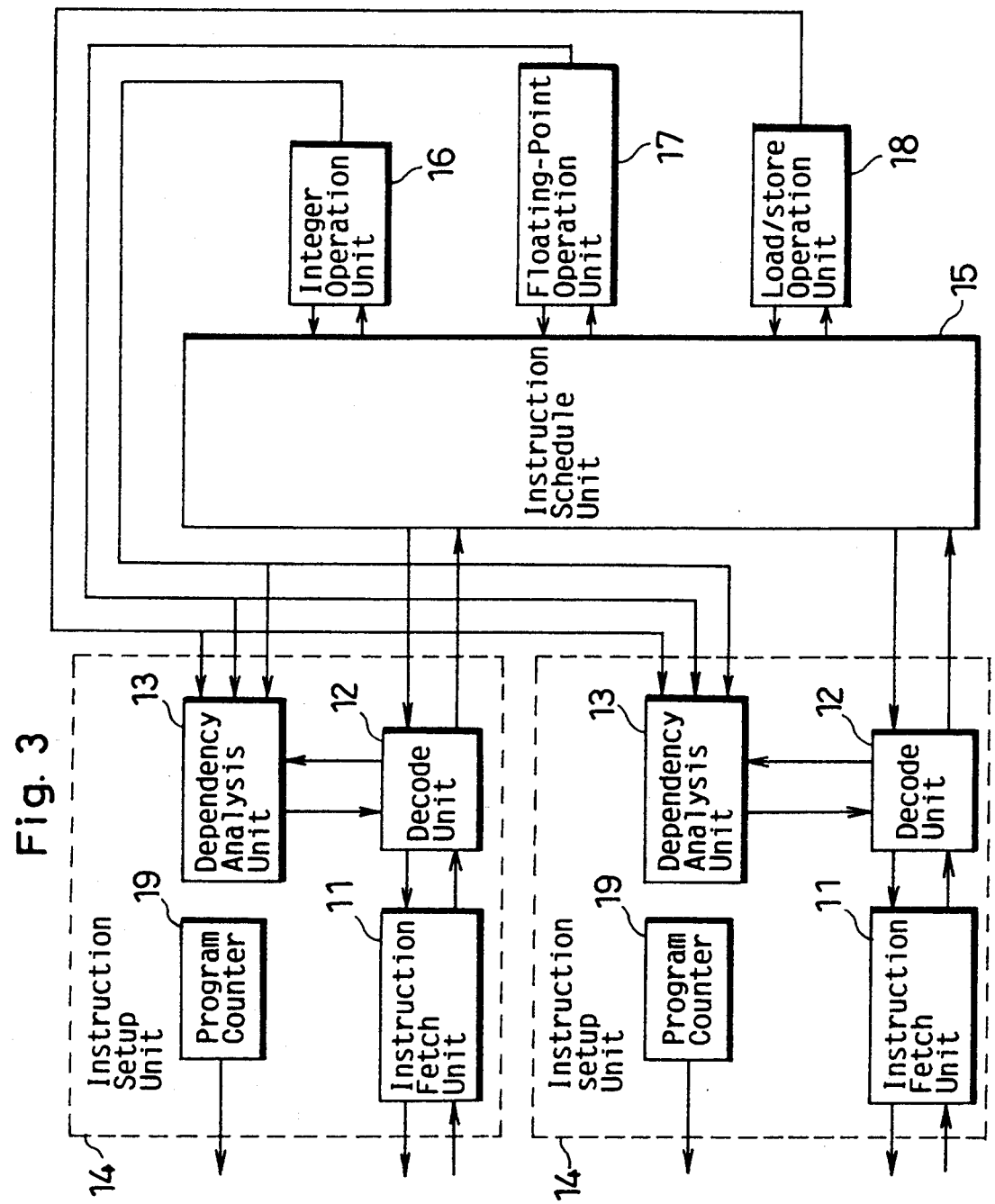
FIG. 3 shows a construction of another embodiment of the information processor of the present invention.

In FIG. 3, there are instruction fetch units 11, decode units 12, dependency analysis units 13, program counters 19, and an instruction schedule unit 15. Function execution units 16–18 are referred to as an integer operation unit, a floating-point operation unit, and a load/store unit respectively in this embodiment. Each portion 14 is referred to as an instruction setup unit comprising a set of the instruction fetch unit 11, the decode unit 12, the dependency analysis 13, and the program counter 19.

The operation of the information processor having the above construction is described as follows with reference to FIG. 3 and Table 1.

Figure 1:
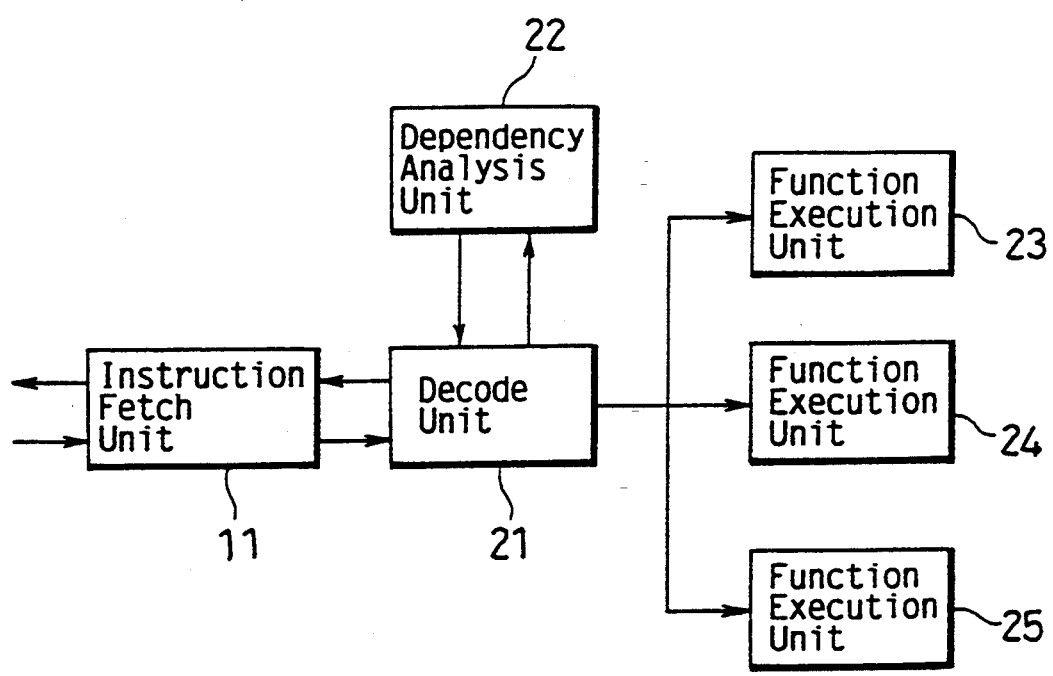
FIG. 1 shows the construction of a conventional information processor.

The hardware shown in FIG. 3 implementing three essential phases of instruction execution: to fetch, decode, and execute instructions differs from that shown in FIG. 1 as an conventional information processor especially in having multiple instruction fetch and decode units which are in charge of the first half of execution phase, or the instruction setup units 14. Each of the instruction setup units 14 is occupied by a single instruction stream for a certain period. In this embodiment having two instruction setup units 14, up to two instruction streams can be processed in parallel. On the other hand, in the second half of the execution phase, instructions from different instruction streams exist together in each of the function execution units 16–19.

The instruction fetch unit 11 which is the same as the one widely used, implements the functions of reading instructions by giving a memory or a cache the address designated by the program counter 19, of disposing the instructions into a determined local instruction register, and of generating various addresses for instruction access. The decode unit 12 decodes each instruction, and if it should be executed in the function execution units 16–18, outputs the decoded instructions, i.e., the operational directives for the function execution units 16–18 to the instruction schedule unit 15.

The dependency analysis unit 13 memorizes and manages which register the instruction in execution phase is inputted or outputted from. This unit may be included in the decode unit 12 in some cases. The instruction schedule unit 15 inputs decoded instructions from each of the decode units 12 to distribute them to the function execution units 16–18. The function execution units 16–18 are in charge of execution phase in instruction pipelines.

More detailed operation of the instruction schedule unit 15 is described as follows.

The instruction schedule unit 15 inputs an instruction type tag T and operational directive information C from the decode unit 12 and outputs a receiving state signal D. The unit 15 inputs an initiating request signal R from each of the function execution units and outputs operational directive information V.

The instruction type tag T indicating to which function execution unit the operational directive information C inputted from the decode unit 12 is sent, can take four values: n, i, f, and m in this embodiment (actually, a binary number is assigned). The n, i, f, and m represent invalid, integer operation, floating-point operation, and load/store respectively. When the value of the instruction type tag T is n, the operational directive information C associated with this is regarded to have no effective information outputted.

The contents and forms of the operational directive information C are different depending on the functional execution unit to which it is sent, but generally, they include more detailed directions than those for operations in the functional execution units 16–18, the numbers of registers used and the like. Since each of the function execution units 16–18 is shared by multiple instruction streams, additional information on the number of the instruction setup unit 14 is including in the operational directive information C in order to avoid the confusion of data used for operation.

The receiving state signal D is a two-state signal reporting to the decode unit 12 whether the operational directive information C outputted from the decode unit 12 has been sent to the function execution units 16–18, i.e., whether the instruction schedule unit 15 can be inputted the next operational directive information C from the decode unit 12.

The initiating request signal R is a two-state signal indicating whether each of the functional execution units 16–18 is capable of accepting new instructions (operational directives). The operational directive information V is an instruction (operational directive) for each of the function execution units 16–18. Either one piece of the operational directive information C inputted from the two instruction setup units 14 is outputted as the operational directive information V.

Table 1 below is a truth table showing the outputted values corresponding to each inputted value to the instruction schedule unit 15. In the table, T[0] and T[1] are respectively the values of the instruction type tags inputted from the decode units 12 of No. 0 and No. 1. C[0] and C[1] are respectively the values of the operational directive information inputted from the units 12 of No. 0 and No. 1. D[0] and D[1] are respectively the values of the receiving state signal outputted to the units 12 of No. 0 and No. 1. I[0] and I[1] are respectively the values of the operational directive information outputted from the units 12 of No. 0 and No. 1. R[0], R[1], and R[2] are respectively initiating request signals inputted from the integer operation unit 16, the floating-point operation unit 17, and the load/store unit 18. V[0], V[1], and V[2] are respectively operational directives outputted to these units 16–18.

TABLE 1

| T[0] | C[0] | T[1] | C[1] | R[2] | D[0] | D[1] | V[0] | V[1] | V[2] |
|------|------|------|------|------|------|------|------|------|------|
| n | — | n | — | * | 1 | 1 | = | = | = |
| n | — | i | I[1] | * | 1 | 1 | I[1] | = | = |
| n | — | f | I[1] | * | 1 | 1 | = | I[1] | = |
| n | — | m | I[1] | 0 | 1 | 0 | = | = | = |
| n | — | m | I[1] | 1 | 1 | 1 | = | = | I[1] |
| i | I[0] | n | — | * | 1 | 1 | I[0] | = | = |
| i | I[0] | i | I[1] | * | 1 | 0 | I[0] | = | = |
| i | I[0] | f | I[1] | * | 1 | 1 | I[0] | I[1] | = |
| i | I[0] | m | I[1] | 0 | 1 | 0 | I[0] | = | = |
| i | I[0] | m | I[1] | 1 | 1 | 1 | I[0] | = | I[1] |
| f | I[0] | n | — | * | 1 | 1 | = | I[0] | = |
| f | I[0] | i | I[1] | * | 1 | 1 | I[1] | I[0] | = |
| f | I[0] | f | I[1] | * | 1 | 0 | = | I[0] | = |
| f | I[0] | m | I[1] | 0 | 1 | 0 | = | I[0] | = |
| f | I[0] | m | I[1] | 1 | 1 | 1 | = | I[0] | I[1] |
| m | I[0] | n | — | * | 0 | 1 | = | = | = |
| m | I[0] | i | I[1] | 0 | 0 | 1 | I[1] | = | = |
| m | I[0] | f | I[1] | 0 | 0 | 1 | = | I[1] | = |
| m | I[0] | m | I[1] | 0 | 0 | 0 | = | = | = |
| m | I[0] | n | — | * | 1 | 1 | = | = | I[0] |
| m | I[0] | i | I[1] | 1 | 1 | 1 | I[1] | = | I[0] |
| m | I[0] | f | I[1] | 1 | 1 | 1 | = | I[1] | I[0] |
| m | I[0] | m | I[1] | 1 | 1 | 0 | = | = | = |

The instruction type tag T[k] (k=0,1) takes any of the n, i, f, and m as mentioned. The value n of the tag T[k] indicates that the decode unit 12 has not outputted effective information as the operational directive information. The symbol "—" on the inputted operational directive information C[k] means that the instruction schedule unit 15 ignores the value.

The value 1 of the inputted initiating request signal R[k] indicates that it can accept the operational directive information V[k], and the value 0 indicates it can not. Judging from the characteristics of the function execution units, i.e., the nonnecessity of the queue of the operator, R[0] and R[1] are assumed always as 1 in this embodiment. In other words, the instruction schedule unit 15 does not take the input of the initiating request signal of the integer operation unit 16 and the floating-point operation unit 17 into account. This is the reason that Table 1 has no column for R[0] and R[1]. The symbol "*" represents 0 or 1 (either will do).

The value 1 of the receiving state signal D[k] indicates it can accept new operational directive (instruction) in the next cycle, and the value 0 indicates it can not. The signal D[k] can be also interpreted that it has issued operational directive information I[k] of the current cycle when the value is 1, and the I[k] is left when it is 0.

The column of the outputted operational directive information V[k] shows which one of the operational directive information input C[0] and C[1] is selected to be outputted to the function execution units. Here, the symbol "=" indicates NOP, i.e., a valid instruction (operational directive) is not outputted.

As shown in Table 1, unless a contention occurs for the function execution units 16–18, instructions (operational directive) outputted from each instruction setup unit 14 are issued in parallel. If resources are in contention, priorities are assigned on a fixed-priority basis. For example, when the instruction (operational directive) outputted from the instruction setup unit 14 of No. 0 has priority over the instruction (operational directive) outputted from the unit 14 of No. 1, this unit has to wait. The operation during such a contention is shown in the 7th, 13th and 23rd lines in the table. Another well-known priority scheduling such as round robin scheduling can be employed instead of the fixed-priority scheduling.

The detailed operation of the instruction decode unit 12 is described as follows.

There are two factors which cause interlocks of the instruction pipelines during the issue of instructions in the information processor of the present invention. One of them is a delay of instruction issue due to data dependencies.

The other is a resource conflict. The decode unit 12 checks the data dependencies and controls the interlocks by the same operation as that of the decode unit 21 shown in the Related Art. The difference between these units is the control of instruction pipeline interlock caused by resource conflicts. The unit 12 must interrupt instruction setup procedure temporarily according to the receiving state signal D of the instruction schedule unit 15. The decode unit 12 checks the value of the signal D outputted by the instruction schedule unit 15 before outputting an information type tag T and operational directive information C to the unit 15. If the examined value of the signal D is 1, it outputs a tag T and information C, and if the value is 0, it outputs the tag T and the information C outputted in the immediately preceding cycle again. This is because the value 0 indicates that the instruction (operational directive) outputted in the preceding cycle was not issued to the function execution units 16–18. Therefore, the outputting cycles of the tag T and the information C from the decode unit 12, and of the signal D from the information schedule unit 15 are staggered by half cycle.

The more detailed operations of the dependency analysis unit 13 and the function execution units 16–18 are described as follows.

The function execution units 16–18 are the same as conventional ones, and their internal operation has no relation with the present invention except for the portion associated with dependency analysis among instructions. The difference is that the decode unit 12 can not independently judge in which unit of the function execution units 16–18 instructions it outputted are executed and finished. This is because the actual issue of the instruction (operational directive) outputted by the unit 12 to the functional execution units 16–18 depends on the operation of the instruction schedule unit 15 which may delay the issue of the instruction (operational directive) when there is a resource conflict. Therefore, taking advantage of register access, the units 16–18 report to the dependency analysis units 13 that the dependency among the instructions have been eliminated. In order to judge to which one of the dependency analysis units 13 it should be reported, the number of the instruction setup units 14 added as part of the operational directive information from the decode unit 12 is used. The dependency analysis units 13 manage the utilization of each register, which has two states of being usable and being reserved for this. The decode unit 12 checks whether the instruction being decoded is to use a reserved register or not (dependencies among instructions). The decoded instruction is outputted to the instruction schedule unit 15 only when the absence of the dependencies among instructions has been confirmed by this check. At this time, the register the instruction will use is recorded in the dependency analysis unit 13 as reserved. The state of being reserved is transitted to the state of being usable by the report from the 16–18.

According to this embodiment, the utilization of each function execution unit can be improved taking advantage of the parallelism of the instruction stream levels by providing multiple instruction setup units and disposing the instruction schedule unit scheduling and assigning instructions (operational directives) outputted from each of the instruction setup units to each function execution unit, between the instruction setup units and the function execution units.

Although three types of function operation units are used as the function execution units 16–18 in this embodiment, these can be homogeneous units, or heterogeneous units having different functions. The number is not limited to 3. This applies to the other embodiments as well.

Although two instruction setup units 14 are provided in this embodiment, the number is not limited to 2. This applies to the other embodiments as well.

Although the number of the instruction setup units 14 is added to the operational directive information C when it is outputted from the decode unit 12, this is designed to be added to the operational directive information V by the instruction schedule unit 15 when it is outputted therefrom. This applies to the other embodiments as well.

<Embodiment 2>

Figure 4:
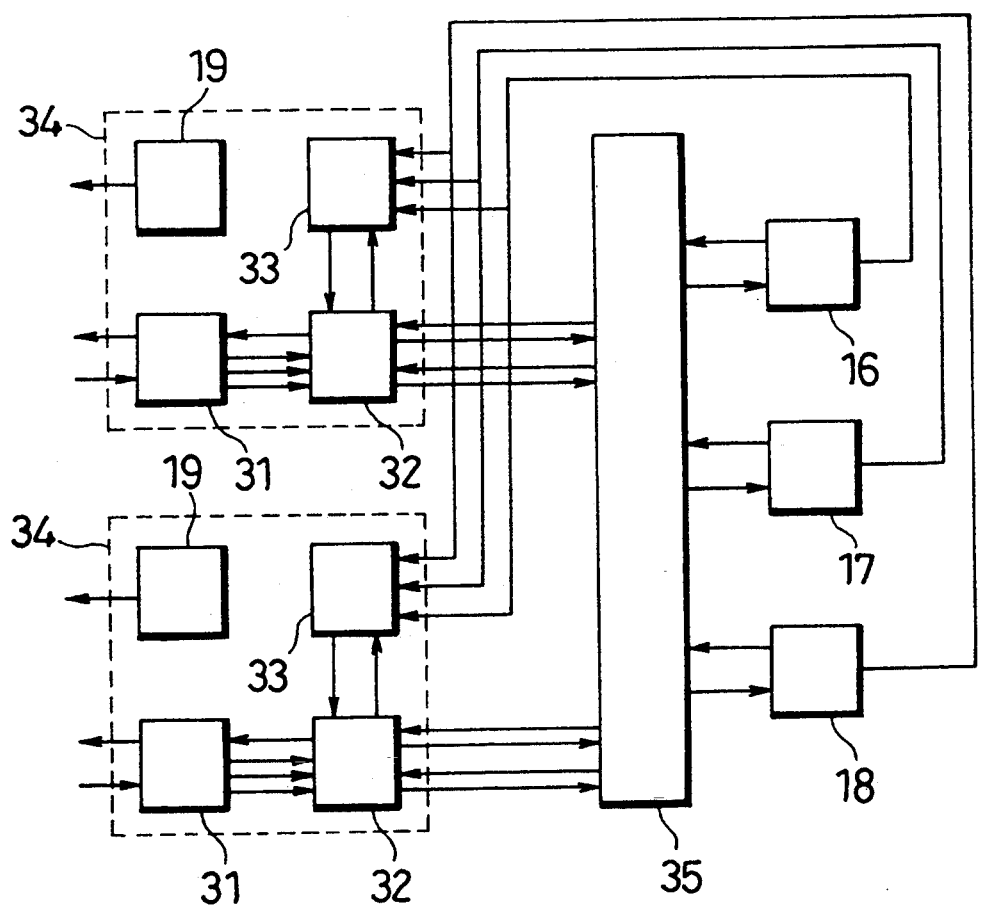
FIG. 4 shows a construction of another embodiment of the information processor of the present invention.

In FIG. 4, there are instruction fetch units 31, decode units 32, dependency analysis units 33, a program counter 19, and an instruction schedule unit 35. Function execution units 16–18 are referred to as an integer operation unit, a floating-point operation unit, and a load/store unit respectively like Embodiment 1. Each portion 34 is referred to as an instruction setup unit comprising a set of the instruction fetch unit 31, the decode unit 32, the dependency analysis unit 33, and a program counter 19.

This embodiment is characterized by an enlarged execution issue of each instruction stream with the use of the super-scalar (multi-instruction issue) technique, compared with the one in Embodiment 1. The differences only are described with reference to FIG. 4 as follows.

The most conspicuous difference from that of Embodiment 1 is the operation of the decode unit 32. By applying the superscalar technique to the instruction issue of the unit 32, multiple instructions (operational directives) capable of being executed in one cycle by one instruction stream are inputted to the instruction schedule unit 35. In this embodiment, three instructions are inputted from the instruction fetch unit 31 in parallel, the instruction capable of being executed is selected among them, and up to two instructions of arithmetic or load/store are outputted to the instruction schedule unit 35.

In order to respond to such a multi-instruction issue, the dependency analysis unit 33 is required to carry out dependency analysis to examine the possibility of issuing multiple instructions at a time.

Some methods are proposed for this and a simple one is to physically expand and increase the dependency analysis unit 13 shown in FIG. 1.

In this embodiment, since two instruction setup units 34 are provided and up to two instructions (operational directives) are outputted to the instruction schedule unit 35 from each of the decode units 32, the instruction schedule unit 35 has four sets of operational directive input ports. Such a construction of the unit 35 can be implemented by increasing the number of the operational directive input ports of the instruction schedule unit 15 in Embodiment 1, to four. When a resource conflict occurs among inputted instructions in the instruction schedule unit 35, it is solved by the fixed-priority scheduling like in the instruction schedule unit 35. In other words, operational directive input ports of No. 0 and No. 1 are assigned to the operational setup unit 34 of No. 0, and such ports of No. 2 and No. 3 are assigned to the instruction setup unit 34 of No. 1. When a resource conflict occurs, the instruction (operational directive) inputted from the port having smaller number is selected with priority. Needless to say, other well-known scheduling such as round robin scheduling can be employed.

According to this embodiment, not only the throughput of the whole procedure is improved but also the time required to process one instruction stream is shorten by providing multiple instruction setup units issuing multiple instructions per cycle and disposing the instruction schedule unit scheduling and assigning instructions (operational directives) outputted from each of the instruction setup units to each function execution unit, between the instruction setup units and the function execution units.

Various superscalar technique in the decode unit of the present invention are proposed, and there is no limitation on the technique applied to this invention. For example, there is no rule about whether instructions are issued by taking the types and numbers of the function execution units into account during instruction decoding.

<Embodiment 3>

Figure 5:
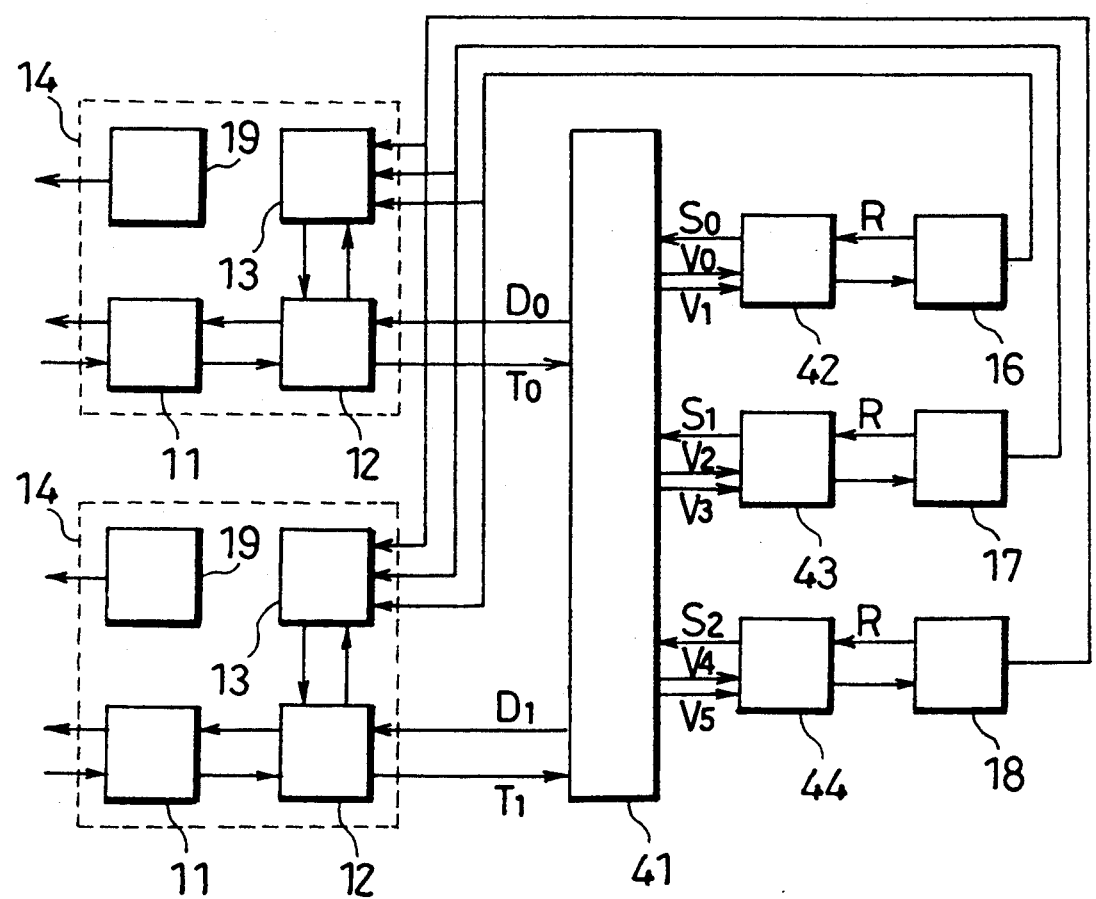
FIG. 5 shows a construction of another embodiment of the information processor of the present invention.

In FIG. 5, there are instruction fetch units 11, decode units 12, dependency analysis units 13, program counters 19, an instruction collector 41 and instruction storing units 42–44. Function execution units 16–18 are referred to as an integer operation unit, a floating-point operation unit, and a load/store unit respectively in this embodiment. Each portion 14 is referred to as an instruction setup unit comprising a set of the instruction fetch unit 11, the decode unit 12, the dependency analysis unit 13 and the program counter 19.

The operation of the information processor having the above construction is described as follows with reference to FIG. 5 and Table 2. Here, since the components 11–14, 16–18 and 19 shown in FIG. 5 are the same as the ones shown in FIG. 3, the following description is focused on the instruction collector 41 and the instruction storing units 42–44.

First, the operation of the instruction collector 41 is described in detail as follows.

The instruction collector 41 is inputted the decoded instructions outputted from each of the decode units 12, and distributes them to each of the instruction storing units 42–44. In the embodiment having two instruction setup units, up to two decoded instructions can be inputted in one cycle.

The instruction collector 41 is inputted the instruction type tag T and the operational directive information C from the decode unit 12 and outputs the receiving state signal D like the instruction schedule unit 15 of Embodiment 1. On the other hand, it is inputted storing state information S from each of the instruction storing units and outputs the operational directive information V.

The storing state information S indicates how many more instructions (operational directives) the instruction storing units 42–44 can accept. The operational directive information V is an instruction (operational directive) for each of the function execution units 16–18. The inputted operational directive information C is outputted as the operational directive instruction V.

Table 2 below is a truth table showing the outputted values corresponding to each inputted value to the instruction collector 41. In the table, T[0] and T[1] are respectively the values of the instruction type tags inputted from the decode units 12 of No. 0 and No. 1. D[0] and D[1] are respectively the values of the receiving state signal outputted to the units 12 of No. 0 and No. 1. S[0], S[1], and S[2] are respectively the values of the storing state information inputted from the instruction storing units 42, 43, and 44. V[0]–V[5] are outputted operational directive information. V[0] and V[1], V[2] and V[3], and V[4] and V[5] are respectively connected with the instruction storing units 42, 43, and 44.

TABLE 2

| T[0] | T[1] | S[0] | S[1] | S[2] | D[0] | D[1] | V[0]~V[5] |
|---|---|---|---|---|---|---|---|
| n | n | * | * | * | 1 | 1 | |
| n | i | 0 | * | * | 1 | 0 | |
| n | i | — | * | * | 1 | 1 | V[0] = C[1] |
| n | f | * | 0 | * | 1 | 0 | |
| n | f | * | — | * | 1 | 1 | V[2] = C[1] |
| n | m | * | * | 0 | 1 | 0 | |
| n | m | * | * | — | 1 | 1 | V[4] = C[1] |
| i | n | 0 | * | * | 0 | 1 | |
| i | n | — | * | * | 1 | 1 | V[0] = C[0] |
| i | i | 0 | * | * | 0 | 0 | |
| i | i | 1 | * | * | 1 | 0 | V[0] = C[0] |
| i | i | 2 | * | * | 1 | 1 | V[0] = C[0], V[1] = C[1] |
| i | f | 0 | 0 | * | 0 | 0 | |
| i | f | 0 | — | * | 0 | 1 | V[2] = C[1] |
| i | f | — | 0 | * | 1 | 0 | V[0] = C[0] |
| i | f | — | — | * | 1 | 1 | V[0] = C[0], V[2] = C[1] |
| i | m | 0 | * | 0 | 0 | 0 | |
| i | m | 0 | * | — | 0 | 1 | V[4] = C[1] |
| i | m | — | * | 0 | 1 | 0 | V[0] = C[0] |
| i | m | — | * | — | 1 | 1 | V[0] = C[0], V[4] = C[1] |
| f | n | * | 0 | * | 0 | 1 | |
| f | n | * | — | * | 1 | 1 | V[2] = C[0] |
| f | i | 0 | 0 | * | 0 | 0 | |
| f | i | 0 | — | * | 1 | 0 | V[2] = C[0] |
| f | i | — | 0 | * | 0 | 1 | V[0] = C[1] |
| f | i | — | — | * | 1 | 1 | V[0] = C[1], V[2] = C[0] |
| f | f | * | 0 | * | 0 | 0 | |
| f | f | * | 1 | * | 1 | 0 | V[2] = C[0] |
| f | f | * | 2 | * | 1 | 1 | V[2] = C[0], V[3] = C[1] |
| f | m | * | 0 | 0 | 0 | 0 | |
| f | m | * | 0 | — | 0 | 1 | V[4] = C[1] |
| f | m | * | — | 0 | 1 | 0 | V[2] = C[0] |
| f | m | * | — | — | 1 | 1 | V[2] = C[0], V[4] = C[1] |
| m | n | * | * | 0 | 0 | 1 | |
| m | n | * | * | — | 1 | 1 | V[4] = C[0] |
| m | i | 0 | * | 0 | 0 | 0 | |
| m | i | 0 | * | — | 1 | 0 | V[4] = C[0] |
| m | i | — | * | 0 | 0 | 1 | V[0] = C[1] |

TABLE 2-continued

| T[0] | T[1] | S[0] | S[1] | S[2] | D[0] | D[1] | V[0]~V[5] |
|---|---|---|---|---|---|---|---|
| m | i | — | * | — | 1 | 1 | V[0] = C[1], V[4] = C[0] |
| m | f | * | 0 | 0 | 0 | 0 | |
| m | f | * | 0 | — | 1 | 0 | V[4] = C[0] |
| m | f | * | — | 0 | 0 | 1 | V[2] = C[1] |
| m | f | * | — | — | 1 | 1 | V[2] = C[1], V[4] = C[0] |
| m | m | * | * | 0 | 0 | 0 | |
| m | m | * | * | 1 | 1 | 0 | V[4] = C[0] |
| m | m | * | * | 2 | 1 | 1 | V[4] = C[0], V[5] = C[1] |

The instruction type tag T[k] (k=0,1) takes any of n, i, f, and m like in Embodiment 1.

The inputted storing state information S[k] takes any of 0, 1, and 2. The value 0 indicates that the instruction storing unit can not accept the operational directive information V at all because of no vacancy for new instructions. The value 1 indicates that the instruction storing unit can accept only one piece of operational directive information V. The value 2 indicates that the instruction storing unit can accept more than two pieces of it. The symbol "—" indicates that the value of the inputted storing state information S[k] can be either 1 or 2. The symbol "*" indicates that the value can be either 0, 1, or 2. The value 1 of the receiving state signal D[k] indicates, like in Embodiment 1, that it can accept new operational directive (instruction) in the next cycle, and the value 0 indicates it can not. The receiving state signal D[k] can be also interpreted that it has issued the operational directive information C[k] in the current cycle to the function execution units when the value is 1, and the information C[k] is left when it is 0.

The column of the outputted operational directive information V[k] shows from which output port the operational directive information C inputted from the decode unit 12 is outputted. C[0] and C[1] indicate the operational directive information outputted from the decode units 12 of No. 0 and No. 1 respectively. The operational directive information output ports which are not appeared in this column either output NOP or does not output effective instruction (operational directive). As shown in Table 2, instructions (operational directives) outputted from each of the instruction setup units 14 are in parallel accepted by the instruction storing units 42–44 as long as they have room to store them even a contention occurs among the function execution units 16–18. On the other hand, when there is a resource conflict and no room to store, the instructions (operational directives) outputted from the instruction setup unit 14 of No. 0 have priority over the ones from the unit 14 of No. 1.

The operation of the instruction storing units 42–44 is described in detail as follows.

The units 42–44 function as buffers for each of associated function execution units 16–18. They can be inputted up to two instructions in parallel acting substantially as a first-in/first-out (FIFO) queue for instructions.

The units 42–44 output storing state information S to the instruction collector 41 and is inputted up to two operational directive information V.

All pieces of the operational directive information stored in the units 42–44 are assigned priorities. The operational directive information stored in the units 42–44 in an earlier cycle is ahead of the one stored in a later cycle. The operational directive information inputted from the first port is ahead in order of the one from the second port. This is indicated by that the instruction collector 41 outputs C[0] from V[2k], and C[1] from V[2k+1] when it outputs two pieces of operational directive information to the same instruction storing unit, while it outputs both C[0] and C[1] from V[2k] when it outputs one piece of such information.

The instruction storing units 42–44 are inputted an initiating request signal R from each of the function execution units 16–18 and outputs the operational directive information stored inside. The initiating request signal R indicates whether each of the function execution units 16–18 are in the condition capable of accepting a new operational directive or not. The units 42–44 output the one with first priority among the internally stored operational directive information to the associating function execution units 16–18 when the signal R indicates that it can accept. However, the input of the signal R to the instruction storing units 42 and 43 can be omitted from the same point of view as Embodiment 1.

According to this embodiment, interlocks in instruction pipelines at the instruction setup stage can be avoided and the instruction setup of the next instruction can be continued even with a resource conflict among the instructions outputted from each instruction setup unit at the same time by providing multiple instruction setup units, providing the instruction collector scheduling and assigning the instructions (operational directives) outputted from each of the instruction setup units between the instruction setup units and the function execution units, and providing the instruction storing units for each function execution unit for temporarily storing instructions (operational directives) outputted from the instruction collector between the instruction collector and the function execution units.

<Embodiment 4>

Figure 6:
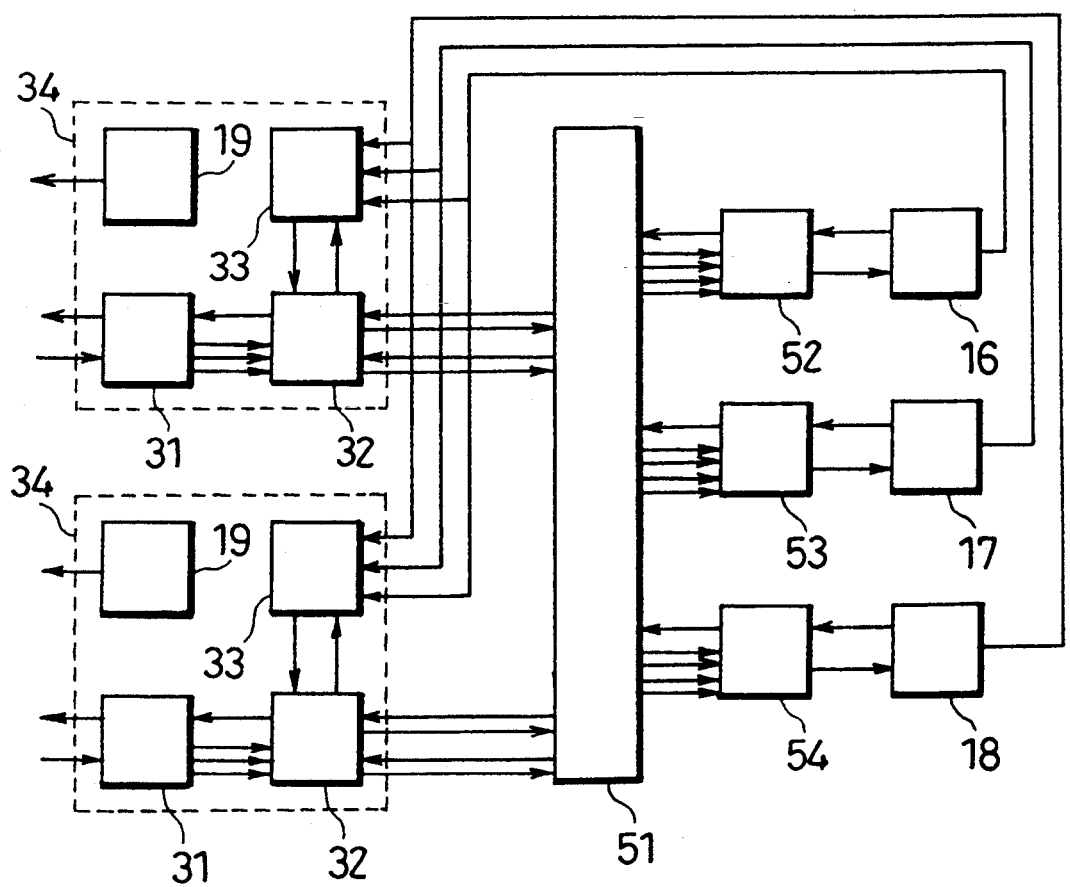
FIG. 6 shows a construction of another embodiment of the information processor of the present invention.

In FIG. 6, there are program counters 19, instruction fetch units 31, decode units 32, dependency analysis units 33, an instruction collector 51, instruction storing units 52–54. Function execution units 16–18 are referred to as an integer operation unit, a floating-point operation unit, and a load/store unit respectively in this embodiment. Each portion 34 is referred to as an instruction setup unit comprising a set of the program counter 19, the instruction fetch unit 31, the decode unit 32, and the dependency unit 33. This embodiment is characterized by an enlarged execution issue of each instruction stream with the use of the superscalar technique, compared with the information processor of Embodiment 3. In this embodiment, the instruction setup units 14 shown in FIG. 5 is replaced with the instruction setup units 34 in FIG. 6 by using the superscalar technique, and an instruction collector and instruction storing units are enlarged. The instruction collector 51 has four sets of interface ports with the decode unit 32, and is the enlargement of the instruction collector 41 for outputting each of the four instructions in parallel to each of the instruction storing units 52–54. This is not logical functional change but the increase of the numbers of the input/output ports or of physical size. The instruction collector 51 is inputted up to four instructions, classifies them according to the types, and outputs them depending on the storing state of the instruction storing units 52–54. The input ports of instructions with a fixed priority scheduling delay the output of instructions with lower priority when the instruction storing units 52–54 have no enough storing room. As mentioned before, round robin scheduling and the like can be employed instead.

The instruction storing units 52–54 whose instruction input number is four, are the enlargement of the instruction storing units 42–44 shown in FIG. 5 whose instruction input number is two. These four instruction input ports are assigned priorities caused by the order of instructions. The storing state signal logically takes five values of 0, 1, 2, 3, and 4 as the instruction input number has become four.

According to this embodiment, the time required for processing one instruction stream can be shorted concurrently processing multiple instruction streams by providing multiple instruction setup units issuing multiple instructions per cycle, providing the instruction collector scheduling and assigning the instructions (operational directives) outputted from each of the instruction setup units between the instruction setup units and the function execution units, and providing the instruction storing units for temporarily storing instructions (operational directives) outputted from the instruction collector between the instruction collector and the function execution units.

The numbers of inputted instructions to the instruction collector unit 51 and of outputted instructions to each instruction storing unit are designed the same, but they may not.

<Embodiment 5>

Figure 7:
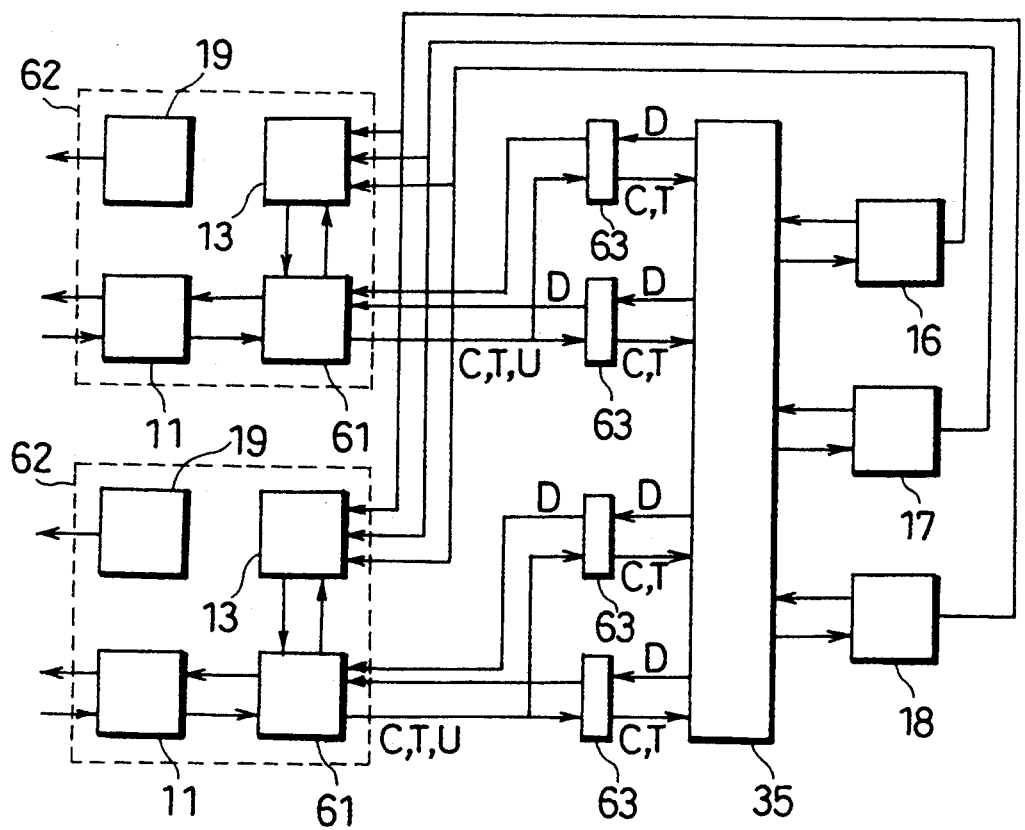
FIG. 7 shows a construction of another embodiment of the information processor of the present invention.

In FIG. 7, there are instruction fetch units 11, decode units 61, dependency analysis units 13, program counters 19, instruction stand-by units 63, and an instruction schedule unit 35. Function execution units 16–18 are referred to as an integer operation unit, a floating-point operation unit, and a load/store unit respectively in this embodiment. Each portion 62 is referred to as an instruction setup unit comprising a set of the instruction fetch unit 11, the decode unit 61, the dependency analysis unit 13, and the program counter 19.

Figure 14:
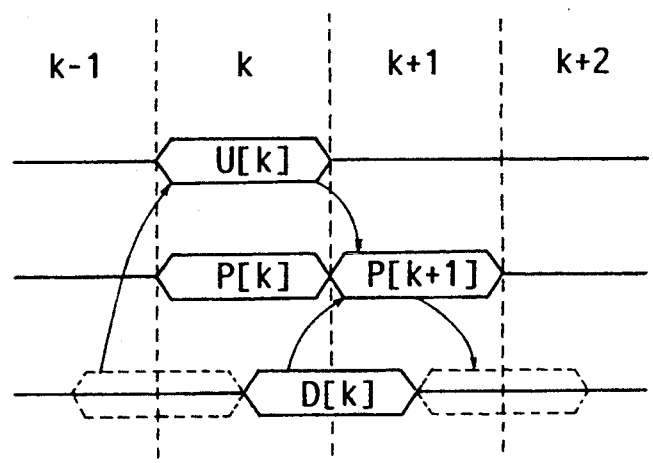
FIG. 14 shows the operational timing of the instruction stand-by unit in the second embodiment of this invention, and the second embodiment of the invention shown in FIG. 7.

The operation of the information processor having the above construction is described as follows with reference to the FIGS. 7 and 14, and Table 3.

Here, since the components 11, 13, and 16–18 shown in FIG. 7 are the same as the ones shown in FIG. 3, and the component 35 shown in FIG. 7 is the same as the one in FIG. 4, the following description is focused on the decode units 61 and the instruction stand-by units 63.

The instruction stand-by units 63 act as buffers to temporarily store instructions (operational directives) outputted from the decode units 61. The units 63 employed in this embodiment are flip-flop type. Since each of the instruction setup units 62 is provided with two instruction stand-by units 63 in this embodiment, two instructions per instruction stream can be kept waiting unscheduled. The operation of the decode units 61 differs from that of the decode units 12 in Embodiment 1 only in that the units 12 distribute the instruction output to each of the two instruction stand-by units 63. The decode units 61 find which one of the instruction stand-by units 63 is vacant at the point of outputting instructions, and output instructions to the vacant one. When both are not vacant, the instruction pipelines are interlocked. The instruction schedule unit 35 schedules instructions stood by in the instruction stand-by units 63, and outputs them to each of the function execution units 16–18. The instructions (operational directives) not selected in the instruction schedule unit 35 because of a resource conflict or another reason remain in the instruction stand-by units 63. When the instructions are selected, the unit 63 becomes vacant.

The operation of the instruction schedule unit 35 is described in detail as follows.

The instruction schedule unit 35 is inputted operational directive information C and an instruction type tag T from the instruction stand-by units 63 and outputs a receiving state signal D. The functions of these signals are the same as those in Embodiment 1 except that the receiving state signal D outputted from the instruction schedule unit 35 is sent not only to the instruction stand-by units 63 but also to the decode units 61. Although FIG. 6 shows the signal D sent to the decode units 61 via the instruction stand-by unit 63, it may be directly sent to the unit 61.

The operation of the decode units 61 is described in detail as follows.

The decode units 61 are inputted the receiving state signal D from the instruction stand-by units 63 and output the operational directive information C and the instruction type tag T to the instruction stand-by units 63. The signal D is originally outputted by the instruction schedule unit 35. The instruction setting signal U becomes effective when the value of the instruction type tag T is other than n. Although the signal U is a spare as long as the instruction type tag T is used, it is used for the convenience of the explanation.

The decode units 61, when output new instructions (operational directive information C and an instruction type tag T), have to find which one of the instruction stand-by units 63 is vacant. This is done by referring to the signal D from the instruction schedule unit 35. The unit 63 having the value 1 of the signal D is vacant. The decode units 61 output the information C and the tag T to such a vacant one among the units 63. Whether the instruction stand-by units 63 accept new instructions or not is directed by the instruction setting signal U. When there are multiple vacant units 63, instructions may be outputted to any of them in this embodiment, but the priority is usually predetermined by a certain rule.

The operation of the instruction stand-by units 63 is described in detail as follows.

The instruction stand-by units 63 are inputted operational directive information C and an instruction type tag T from the decode units 61. Whether the information is actually recorded in the instruction stand-by units 63 or not is directed by the instruction setting signal U from the decode units 61.

The value recorded in the instruction stand-by units 63 is incessantly outputted to the instruction schedule unit 35. On the other hand, the instruction stand-by units 63 are inputted the receiving state signal D outputted by the instruction schedule unit 35 and control the recording conditions of the instruction stand-by units 63. This is because the recorded contents must be abandoned when they are accepted by the instruction schedule unit 35.

Table 3 shows the operation of the instruction stand-by units 63.

TABLE 3

| U[k] | D[k] | P[k + 1] |
|------|------|----------|
| 0 | 0 | P[k] |
| 0 | 1 | (n, *) |
| 1 | 1 | (T[k], C[k]) |

First described is the timing of the operation. The instruction stand-by units 63 are operated synchronously with the decode units 61, and stag by half cycle with the instruction schedule unit 35 as shown in FIG. 14. U[k] in Table 3 and FIG. 14 represents an instruction setting signal from the decode units 61 in the cycle k. The value 1 indicates the decode units 61 are outputting the information C[k] and the tag T[k] at the same time. On the other hand, the value 0 indicates that no new instruction is required to be set. D[k] represents the receiving state signal outputted from the instruction schedule unit 35 in the latter half of the cycle k (and the former half of the cycle k+1). P[k] is the information C and the outputted tag T of the instruction stand-by units 63 in the cycle k.

The operation of the instruction stand-by units 63 is described in detail with reference to Table 3.

D[k]=0 indicates that the instruction schedule unit 35 did not receive the instruction recorded in the instruction standby units 63. Since the instruction stand-by units 63 can not release the instruction, they output the instruction P[k] they hold again in the next cycle. Since the decode units 61 determine their operation based on the value of D[k], U[k]=1 never happens when D[k]32 0. Therefore, they output U[k]=0 whenever D[k]=1.

On the other hand, when D[k]=1, the instruction stand-by units 63 have to release the instruction they hold. Since U[k]=0 indicates that there is no next instruction to store in the instruction stand-by units 63, the units 63 can nullify (n) the outputted operational directive tag. The change of the outputted tag allows the value in the previous cycle to be outputted. Since the next instruction to be processed exists, the units 63 record a new tag T[k] and information C[k] and output them when U[k]=1. The T[k] and C[k] are the values that the decode units 61 outputted in the cycle k.

According to this embodiment, interlocks in instruction pipelines at the instruction setup stage can be avoided and the instruction setup of the next instruction can be continued even when there is a resource conflict among the instructions outputted from each instruction setup unit at the same time, by providing multiple instruction setup units, providing the instruction schedule units for scheduling (issuing time, adjustment and judgement of priority and the like) and assigning the instructions(operational directives) outputted from each of the instruction setup units to each function execution unit between the instruction setup units and the function execution units, and providing multiple instruction storing units for each instruction setup unit for temporarily storing instructions (operational directives) outputted from the instruction setup units between the instruction setup units and the instruction schedule units.

The results of this embodiment is different from those of Embodiment 3 in scheduling of instructions as follows.

According to Embodiment 3, when a resource conflict occurs, the instructions which caused the contention are stored in the instruction storing units. Therefore, each instruction never be passed by the following instruction outputted from another instruction setup unit in later cycles. Thus, instruction scheduling among instruction streams is carried out fairly even with a fixed priority as an algorithm of the instruction collector. On the other hand, according to this embodiment, scheduling is not done impartially. The instructions outputted from the instruction setup units are scheduled in every cycle. When there are successive instructions using the same resource in an instruction stream, if the stream has been processed by the instruction setup unit with higher priority, instructions outputted from the other instruction setup unit have to wait for the resource to be released. This means that whether an instruction is issued earlier or not is not taken into consideration in instruction scheduling. These embodiments having such differences can not be put one above the other, and either of them can be selected depending on the object of the information processor.

<Embodiment 6>

In this embodiment, an unillustrated latch type of memory device is used instead of the one of D flip-flop type used in the instruction stand-by units 63 of Embodiment 5. Therefore, unlike the former embodiments, the outputted instruction from the decode units 61 is passed unchanged to the instruction schedule unit 35 depending on the conditions of the clock signal, and consequently there are some differences in the timing and the like.

Figure 15:
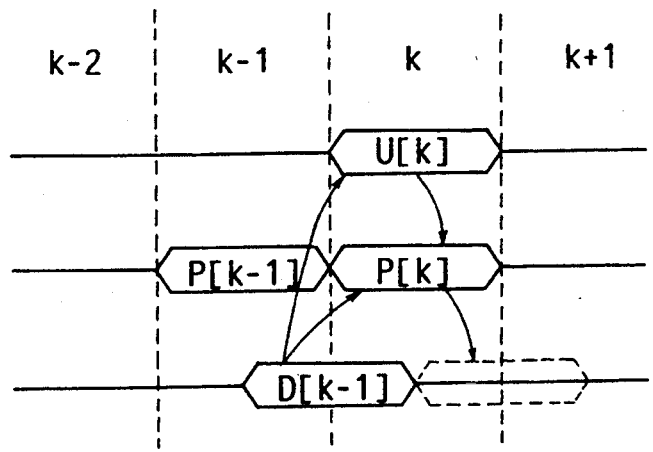
FIG. 15 shows the construction of the third embodiment of the information processor of the present invention.

Table 4 shows the operation of the instruction stand-by units 63, and FIG. 15 shows the timing of the operation using the same symbols as Embodiment 1.

TABLE 4

| U[k] | D[k − 1] | P[k] |
|---|---|---|
| 0 | 0 | P[k − 1] |
| 0 | 1 | (n, *) |
| 1 | 1 | (T[k], C[k]) |

D[k−1]=0 indicates that the instruction schedule unit 35 did not receive the instruction recorded in the instruction stand-by units 63. Since the instruction stand-by units 63 can not release the instruction, they output the instruction P[k−1] they hold again in the next cycle. Since the decode units 61 determine their operation based on the value of D[k−1], U[k]=1 never happens when D[k−1]=0. Therefore, they output U[k]=0 whenever D[k−1]=0.

On the other hand, when D[k−1]=1, the instruction stand-by units 63 have to release the instruction they hold. Since U[k]=0 indicates that there is no next instruction to store in the instruction stand-by units 63, the units 63 can nullify (n) the outputted instruction type tag. The change of the outputted tag allows the value in the previous cycle to be outputted. Since the next instruction to be processed exists, the units 63 pass a new tag T[k] and information C[k] and output them to the instruction schedule unit 35 when U[k]=1. Although T[k] and C[k] are temporarily held in the instruction stand-by units 63 near the end of cycle k, they are released at the beginning of the next cycle (k+1).

According to this embodiment, the instruction pipeline stage in Embodiment 1 can be bypassed by passing the instruction output of the decode units 61 directly to the instruction schedule unit 35 in some cases, using the latch type memory device as instruction memory in the instruction stand-by units 63. Needless to say, the instruction stand-by units 63 can be included in the decode units 61.

<Embodiment 7>

Figure 8:
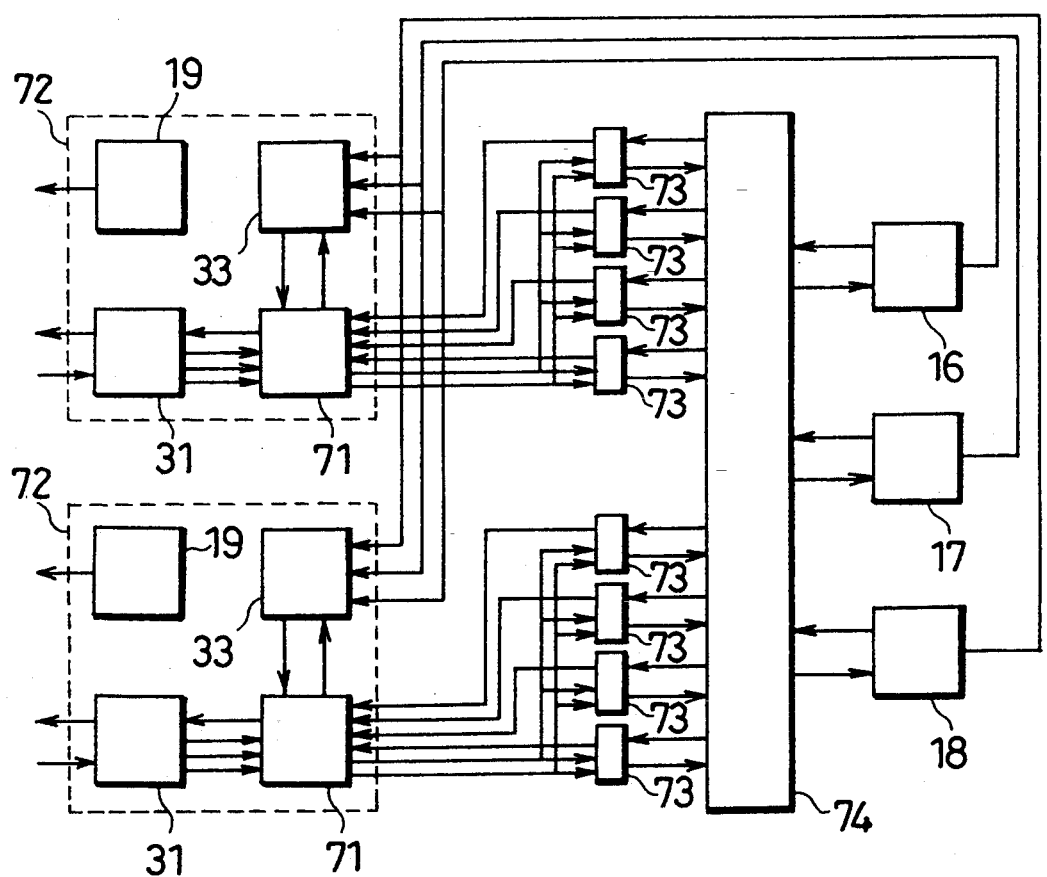
FIG. 8 shows a construction of another embodiment of the information processor combined the constructions shown in the first and second embodiments and those in FIGS. 12 and 18.

In FIG. 8, there are program counters 19, instruction fetch units 31, decode units 71, dependency analysis units 33, instruction stand-by units 73, and an instruction schedule unit 74. Function execution units 16–18 are referred to as an integer operation unit, a floating-point operation unit, and a load/store unit respectively in this embodiment. Each portion 72 is referred to as an instruction setup unit comprising a set of the instruction fetch unit 31, the decode unit 71, the dependency analysis unit 33, and the program counter 19.

This embodiment is characterized by an enlarged instruction stand-by units and instruction schedule units with the use of the superscalar technique, compared with the information processor of Embodiment 5. Since the components 31 and 33, and 16–18 shown in FIG. 7 are respectively the same as the ones shown in FIG. 4 and the ones in FIG. 3, the following description is focused on differences between them. The information processor shown in FIG. 8 has enlarged instruction setup units and instruction schedule units in accordance with the replacement of the instruction setup units 62 shown in FIG. 7 by the superscalar instruction setup units 72. The decode units 71 issue up to two instructions to be executed to the instruction stand-by units 73 in parallel, select any vacant unit among the four instruction setup units, and output up to two of the decoded instructions in parallel. When there are two instructions to be executed in parallel and one vacant instruction stand-by unit, either one instruction have to wait to be outputted. When there is no vacant unit, the instruction pipelines are interlocked. Which unit is vacant is judged by the receiving signal from the instruction schedule units 74 like the former embodiments.

The operation of the instruction stand-by units 73 is almost the same as that of the instruction stand-by units 63 of Embodiment 5, however, it has an additional function of selecting one of the two instructions outputted from the decode units 71 by adding one more input port from the decode units 71. This is because the instruction setting signals of both ports never become 1 at the same time because the decode units 71 match each instruction with each instruction stand-by unit. The instruction schedule units 74 have eight sets of interface ports with the instruction stand-by units 73. This is not essential change in logical function but the increase of the number of the input/output ports to the instruction schedule unit 35 and of the physical size. Since fixed priority is preassigned to the input port of instructions, if the number of inputted instructions is beyond the capacity of the function execution units, instructions with lower priority have to wait.

According to this embodiment, the characteristics of processing multiple instruction streams in parallel can be maintained and the time required to process one instruction stream can be shortened by providing multiple instruction setup units issuing multiple instructions per cycle, providing the instruction schedule units scheduling and assigning the instructions(operational directives) outputted from each of the instruction setup units to each corresponding function execution unit between the instruction setup units and the function execution units, and providing multiple instruction stand-by units for temporarily storing instructions (operational directives) outputted from the instruction setup units between the instruction setup units and the instruction schedule nits.

<Embodiment 8>

Figure 9:
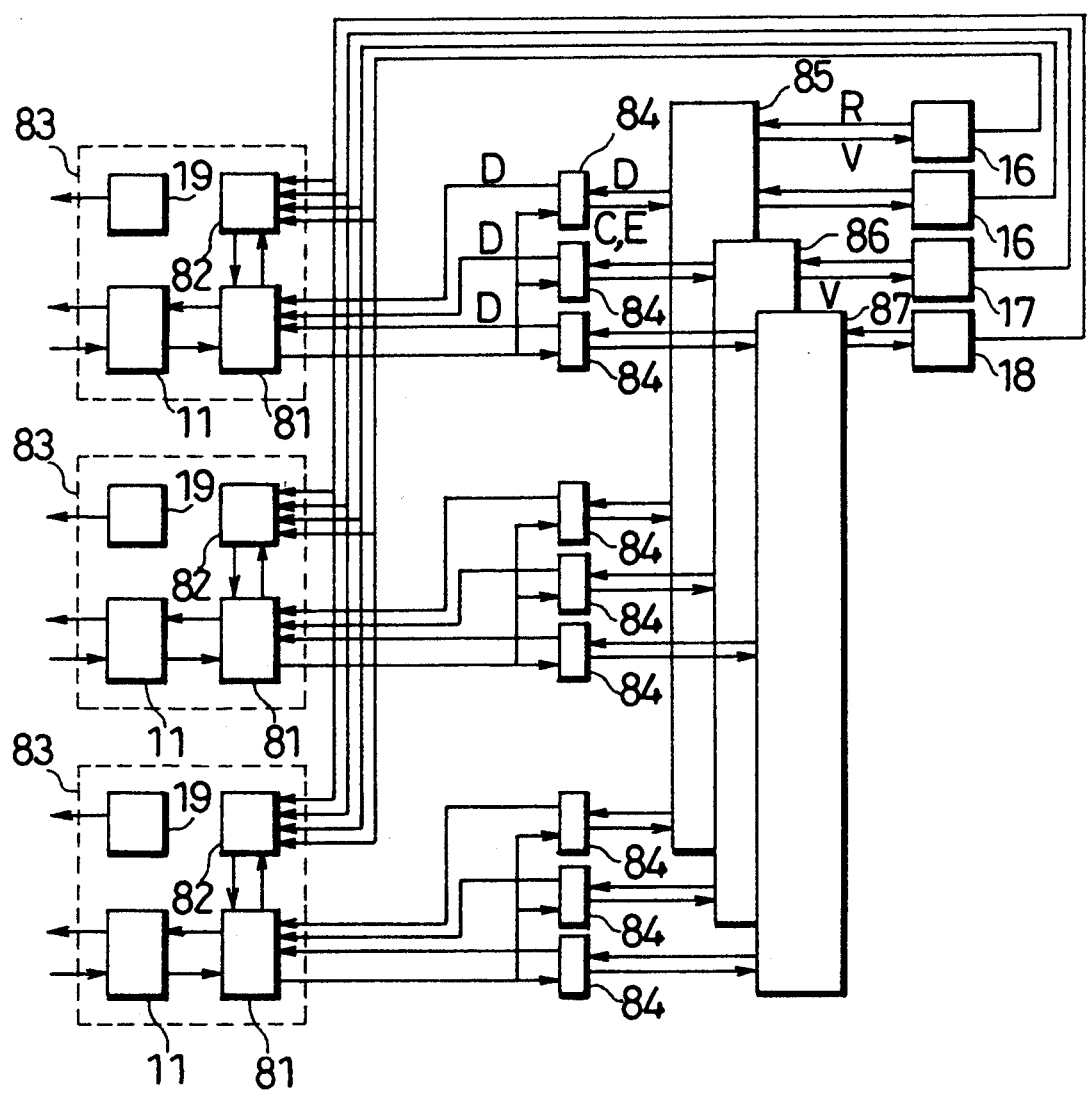
FIG. 9 shows a construction of another embodiment of the information processor of the present invention.

In FIG. 9, there are program counters 19, instruction fetch units 11, decode units 81, dependency analysis units 82, instruction stand-by units 83, and instruction schedule units 85–87. Function execution units 16–18 are referred to as integer operation units, a floating-point operation unit, and a load/store unit respectively in this embodiment. Each portion 83 is referred to as an instruction setup unit comprising a set of the instruction fetch unit 11, the decode unit 81, the dependency analysis unit 82, and the program counter 19.

In this embodiment, unlike the previous embodiments, there are three sets of instruction setup units 83, and up to three instruction streams can be processed in parallel. The conspicuous difference from the previous embodiments is that both of the instruction stand-by units 84 and the instruction schedule units 85-87 are divided into three to provide to each of the two integer operation units, the floating-point operation unit, and the load/store unit.

The operation of the information processor having the above construction is described as follows with reference to FIGS. 9 and 14, and Tables 5-8.

Here, the components 11, and 16-18 in FIG. 9 are the same as the ones 16-18 in FIG. 3. Also, the operation of the dependency analysis units 82 is the same as that of the dependency analysis units 13 in FIG. 3 except that the number of the input ports from the function execution units becomes four. Therefore, the following description is focused on the operation of the decode units 81, the instruction stand-by units 84, and the instruction schedule units 85-87.

The instruction stand-by units 84 act as buffers for temporarily storing the instructions (operational directives) outputted from the decode units 81. Since three instruction stand-by units are provided to each instruction setup unit 83, up to three types of instructions per instruction stream can be stood by as unscheduled in this embodiment.

The operation of the decode units 81 differs from that of the decode units 61 of the previous embodiment in that instructions are outputted to one of the three instruction stand-by units 63 depending on the types.

The decode units 81 checks whether the unit of the instruction stand-by unit 84 corresponding to the type of the decoded instruction is vacant or not. When it is, the units 81 output the decoded result to the unit, otherwise interlocks the instruction pipelines. For example, when there is any instruction in the instruction stand-by unit 84 for integer operation, the next instruction for integer operation is kept waiting to be issued until the earlier instruction is accepted by the instruction schedule unit 85. On the other hand, if the next instruction is a load instruction and there is a vacant instruction stand-by unit 87 for load/store instructions, the instruction does not wait to be issued. The instruction schedule units 85-87 schedule the instructions waiting in the instruction stand-by unit 84, and output them to each of the function execution units 16-18. Unselected instructions by the units 85-87 are remained in the instruction stand-by unit 84. When an instruction is selected, the unit 84 becomes vacant.

The operation of the instruction schedule units 85-87 is described in detail as follows.

The instruction schedule units 85-87 are inputted operational directive information C and an instruction existence signal E from the instruction stand-by units 84, and output receiving state signal D. These C and D are the same as those mentioned in Embodiment 1 except that the signal D outputted from the instruction schedule unit 85 is sent not only to the instruction stand-by unit 84 but also to the decode unit 81. Although the signal D is sent to the decode unit 81 via the unit 84 in FIG. 9, it may directly sent.

The instruction existence signal E offering the same function as the instruction schedule units 15, 35, and 74, and the instruction collectors 41 and 51 mentioned in the previous embodiments, indicates whether there is an effective instruction in the instruction stand-by units 84 or not. In this embodiment, the types of instructions are not taken into consideration in scheduling because the instructions are already classified before the decoded results are outputted from the decode unit 81, and the instruction schedule units 85-87 are provided depending on the types of the instructions.

On the other hand, the instruction schedule units 85-87 are inputted initiating request signal R and output operational directive information V to the function execution units 16-18. These signals are the same as the ones mentioned in Embodiment 1.

The instruction schedule units 85-87 select some instructions out of the inputted instructions (operational directives) and output them to the functional execution units 16-18.

The operation of each of the instruction schedule units 85-87 in FIG. 9 is described as follows.

Table 5 shows the correspondence (truth values) between input values and output values in the instruction schedule unit 86 for floating-point operation.

TABLE 5

| E[0] | E[1] | E[2] | D[0] | D[1] | D[2] | V |
|---|---|---|---|---|---|---|
| 0 | 0 | 0 | 1 | 1 | 1 | = |
| 0 | 0 | 1 | 1 | 1 | 1 | C[2] |
| 0 | 1 | 0 | 1 | 1 | 0 | C[1] |
| 1 | 0 | 0 | 1 | 1 | 0 | C[0] |
| 0 | 1 | 1 | 1 | 1 | 0 | C[2] |
| 1 | 0 | 1 | 1 | 1 | 0 | C[0] |
| 1 | 1 | 0 | 1 | 0 | 1 | C[0] |
| 1 | 1 | 1 | 1 | 0 | 0 | C[0] |

In Table 5, E[k] and D[k] are respectively an inputted instruction existence signal and an outputted receiving state signal communicated with the instruction stand-by units 84 for storing instructions outputted from the decode unit 81 of No. k. The value 1 of E[k] indicates that there is operational directive information in the instruction stand-by unit 84, and the value 0 indicates that there is not. The value 1 of D[k] indicates that new operational directive information can be accepted in the next cycle, and the value 0 indicates that it can not. V represents the operational directive information outputted to the floating-point operation unit 17. C[k] in the V column indicates that the operational directive information inputted from the instruction stand-by unit 84 connected with the decode unit 81 of No. k is outputted to the floating-point operation unit 17. The symbol "=" indicates that effective operational directive information is not outputted. The initiating request signal R indicates that it is always acceptable.

In this embodiment, scheduling of instructions (operational directives) is implemented on the fixed-priority basis. The instruction (operational directive) from the instruction stand-by unit of No. 0 has the highest priority and the one from that of No. 2 has the lowest. Since the value of D[0] is always 1 in this embodiment, it may be omitted.

Table 6 shows the correspondence (truth values) between input values and output values in the instruction schedule unit for integer operation.

TABLE 6

| E[0] | E[1] | E[2] | D[0] | D[1] | D[2] | V[0] | V[1] |
|------|------|------|------|------|------|------|------|
| 0 | 0 | 0 | 1 | 1 | 1 | = | = |
| 0 | 0 | 1 | 1 | 1 | 1 | = | C[2] |
| 0 | 1 | 0 | 1 | 1 | 1 | C[1] | = |
| 1 | 0 | 0 | 1 | 1 | 1 | C[0] | = |
| 0 | 1 | 1 | 1 | 1 | 1 | C[1] | C[2] |
| 1 | 0 | 1 | 1 | 1 | 1 | C[0] | C[2] |
| 1 | 1 | 0 | 1 | 1 | 1 | C[0] | C[1] |
| 1 | 1 | 1 | 1 | 1 | 0 | C[0] | C[1] |

The symbols used in Table 6 are the same as in Table 5, however, there are two outputted operational directive information V[0] and V[1] in order to correspond to two integer operation units 16 connected with the instruction schedule unit 85. For this, up to two instructions among up to three inputted instructions can be outputted. In this embodiment, in order to simplify the internal of the instruction schedule unit 85, the output of inputted C[1] and C[2] always begin with V[0] and V[1] respectively, and the input C[1] is divided to either V[0] or V[1].

Table 7 shows the correspondence (truth values) between inputted values and outputted values in the instruction schedule unit 87.

TABLE 7

| E[0] | E[1] | E[2] | R | D[0] | D[1] | D[2] | V |
|------|------|------|---|------|------|------|---|
| 0 | 0 | 0 | 1 | 1 | 1 | 1 | = |
| 0 | 0 | 1 | 1 | 1 | 1 | 1 | C[2] |
| 0 | 1 | 0 | 1 | 1 | 1 | 0 | C[1] |
| 1 | 0 | 0 | 1 | 1 | 1 | 0 | C[0] |
| 0 | 1 | 1 | 1 | 1 | 1 | 0 | C[2] |
| 1 | 0 | 1 | 1 | 1 | 1 | 0 | C[0] |
| 1 | 1 | 0 | 1 | 1 | 0 | 1 | C[0] |
| 1 | 1 | 1 | 1 | 1 | 0 | 0 | C[0] |
| 0 | 0 | 0 | 0 | 1 | 1 | 1 | = |
| 0 | 0 | 1 | 0 | 1 | 1 | 0 | = |
| 0 | 1 | 0 | 0 | 1 | 0 | 1 | = |
| 1 | 0 | 0 | 0 | 0 | 1 | 1 | = |
| 0 | 1 | 1 | 0 | 1 | 0 | 0 | = |
| 1 | 0 | 1 | 0 | 0 | 1 | 0 | = |
| 1 | 1 | 0 | 0 | 0 | 0 | 1 | = |
| 1 | 1 | 1 | 0 | 0 | 0 | 0 | = |

The symbols used in Table 7 are the same as in Table 5, however, the initiating request signal D is taken into account in the instruction schedule unit 87. When R is 1, or the load/store unit 18 demands a new instruction, operation for it is the same as that of the instruction schedule unit 86 shown in Table 5. When R is 0, or the load/store unit 18 can not accept a new instruction, the unit 87 outputs 0 as the receiving state signal D to restrict the output of operational directive information V.

The operation of the decode units 81 is described in detail as follows.

The decode units 81 are inputted a receiving state signal D from the instruction stand-by units 84 and output operational directive information C and an instruction setting signal U thereto. The receiving state signal D is originally outputted by the instruction schedule units 85-87 as mentioned before.

The decode units 81, when output new instructions (operational directive information C), have to find which one of the instruction stand-by units 84 is vacant. This is done by referring to the receiving state signal D from the instruction schedule units 85-87. When the value of the signal D is 1, or the instruction schedule units 85-87 can accept instructions, the units 81 issue them (C) to the instruction stand-by units 84. Whether the instruction stand-by units 84 accept new instructions or not is directed by the instruction setting signal U. When the value of the signal D is 0, the instruction pipelines are interlocked until the value changes to 1.

The operation of the instruction stand-by units 84 is described in detail as follows.

The instruction stand-by units 84 are inputted operational directive information C from the decode units 81. Whether the information is actually recorded in the instruction stand-by units 84 or not is directed by the instruction setting signal U from the decode units 81. The value recorded in the instruction stand-by units 84 is incessantly outputted to the connected unit of the instruction schedule unit 85-87.

On the other hand, the instruction stand-by units 84 control the recording conditions of itself by the input of the receiving state signal D outputted by the instruction schedule units 85-87. This is because the recorded contents must be released when they are accepted by the instruction schedule units 85-87.

Table 8 shows the operation of the instruction stand-by units 84.

TABLE 8

| U[k] | D[k] | E[k + 1] | P[k + 1] |
|------|------|----------|----------|
| 0 | 0 | E[k] | P[k] |
| 0 | 1 | 0 | * |
| 1 | 1 | 1 | C[k] |

First described is the timing of the operation. The instruction stand-by units 84 are operated synchronously with the decode units 81, and stags by half cycle with the instruction schedule units 85-87 as shown in FIG. 14. U[k] in Table 8 and FIG. 14 represents an instruction setting signal from the decode units 81 in the cycle k. The value 1 indicates both the instruction should be set and the decode units 81 are outputting operational directive information C[k]. On the other hand, the value 0 indicates that no new instruction is required to set. D[k] represents the receiving state signal outputted from the instruction schedule units 85-87 in the latter half to the cycle k (and the former half of the cycle k+1). P[k] and E[k] are respectively outputted operational directive information and an instruction existence signal of the instruction stand-by units 84 in the cycle k. Here, each k in D[k] and E[k] represents the cycle, and the k used in the description of the instruction schedule units 85-87 represents the order.

The operation of the instruction stand-by units 84 shown in Table 8 is basically the same as that of the instruction stand-by units 63 in the previous embodiment except that interfaces are a little changed following the change of the construction of the instruction schedule units 85-87, as apparent from the resemblance between the contents of Table 8 and Table 3.

According to this embodiment, as described hereinabove, an information processor having a large number of instruction stand-by units and function execution units with high utilization can be easily implemented without making the construction of the instruction schedule units complicated, by providing multiple instruction setup units, providing the instruction schedule units for scheduling and assigning the instructions(operational directives) outputted from each of the instruction setup units to each function execution unit between the instruction setup units and the function execution units, and providing multiple instruction stand-by units for temporarily storing the instructions (operational directives) outputted from the instruction setup units between the instruction setup units and the instruction schedule units so that one or more than one instruction stand-by units can correspond to each instruction setup/schedule units.

<Embodiment 9>

Unlike Embodiment 8 in which instruction outputted from the decode units 81 is temporarily held in the instruction stand-by units 84, in this embodiment, the instruction outputted from the units 81 are directly sent to the instruction schedule units 85–87 in some cases by the use of a latch type memory device as instruction memory in the unit 84. Therefore, there are some differences in the timing and the like.

Table 9 shows the operation of the instruction stand-by units 83, and FIG. 15 shows the timing of the operation using the same symbols as Embodiment 1. The basic operation of the instruction stand-by units 84 is the same as that of the instruction stand-by units 63 shown in FIG. 7.

TABLE 9

| U[k] | D[k − 1] | E[k] | P[k] |
|---|---|---|---|
| 0 | 0 | E[k − 1] | P[k − 1] |
| 0 | 1 | 0 | * |
| 1 | 1 | 1 | C[k] |

According to this embodiment, the instruction pipeline stage in instruction issuing in Embodiment 8 can be bypassed by passing the instruction outputted from the decode units 81 directly to the instruction schedule unit 85–87 in some cases, using the latch type memory device as instruction memory in the instruction stand-by units 84.

<Embodiment 10>

Figure 16:
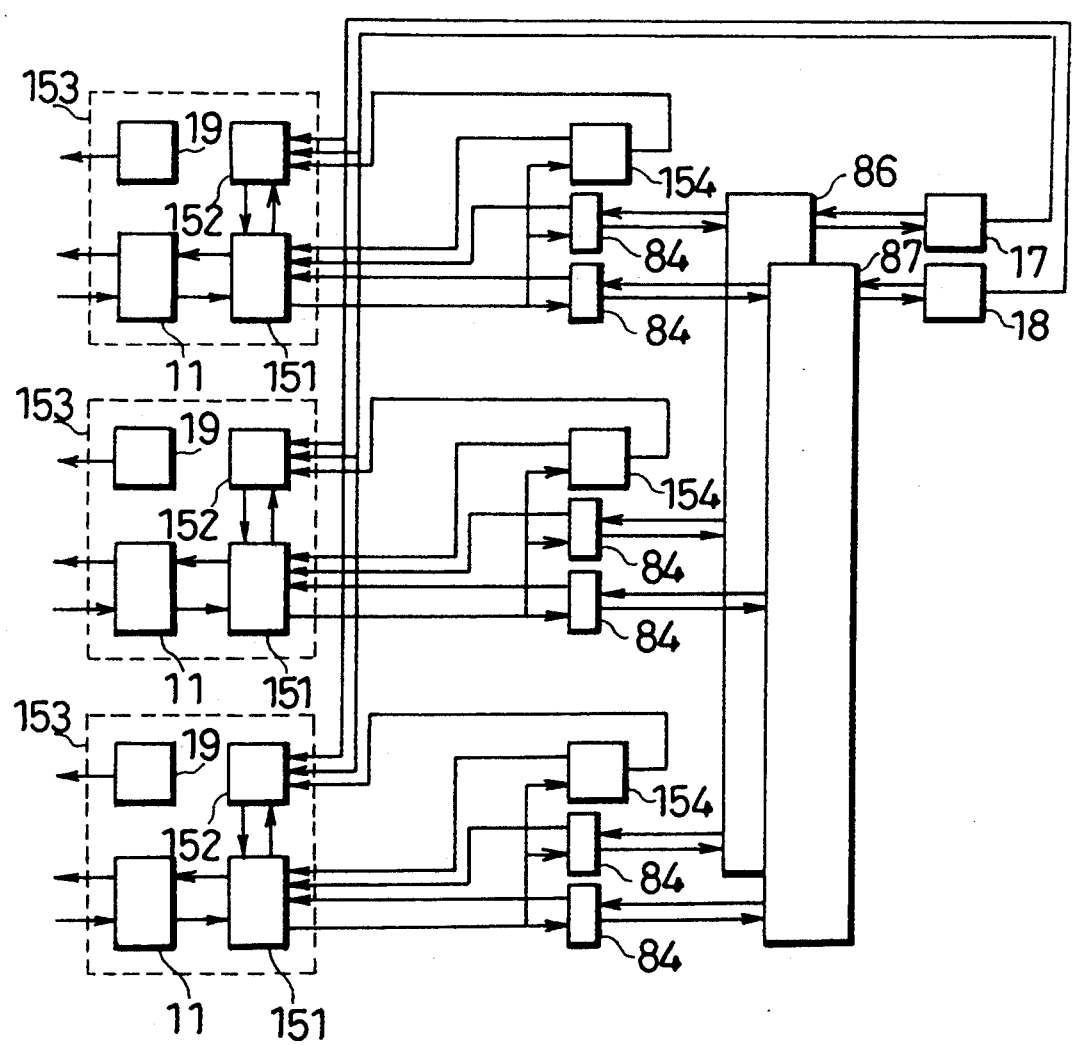
FIG. 16 shows the construction of another embodiment of the information processor of the present invention.

In FIG. 16, there are program counters 19, instruction fetch units 11, decode units 151, dependency analysis units 152, instruction stand-by units 84, and instruction schedule units 85–87. Function execution units 154, 17, and 18 are referred to as integer operation units, a floating-point operation unit, and a load/store unit respectively in this embodiment. Each portion 153 is referred to as an instruction setup unit comprising a set of the instruction fetch unit 11, the decode unit 151, the dependency analysis unit 152, and the program counter 19. The components 11, and 17–19 in FIG. 16 are the same as the ones shown in FIG. 3. Also, the components 82, 86 and 87 are the same as the ones shown in FIG. 9.

The difference from the embodiment shown in FIG. 9 is that the integer operation unit 154 is not shared among the instruction streams but provided to each instruction setup unit. Therefore, the decode units 151 output load/store instructions to the instruction stand-by units 84, and integer operation instructions directly to the integer operation unit 154. The basic operation of the decode units 151, the dependency analysis units 152, and the integer operation units 154 are the same as that of the decode units 81, dependency analysis units 82, and the integer operation units 16.

The information processor shown in FIG. 16 has a construction in which instruction stand-by units for integer operation are omitted, and each output from the decode units and each input to the integer operation unit are fixed inside the instruction schedule unit for integer operation having three input portions and three output portions.

According to this embodiment, an information processor which works effectively depending on the types of instructions of instruction streams and appearing frequency, can be constructed using different instruction schedule units according to the types of the function execution group by providing the instruction schedule unit to each group. Thus, such construction can be employed when high speed operation can not be obtained because multiple instruction streams have to share a few integer operation units in order to process high frequency of integer operation. Needless to say, the instruction stand-by units 84 can be included in either the decode units 81 or the instruction schedule units 85–87.

<Embodiment 11>

Figure 10:
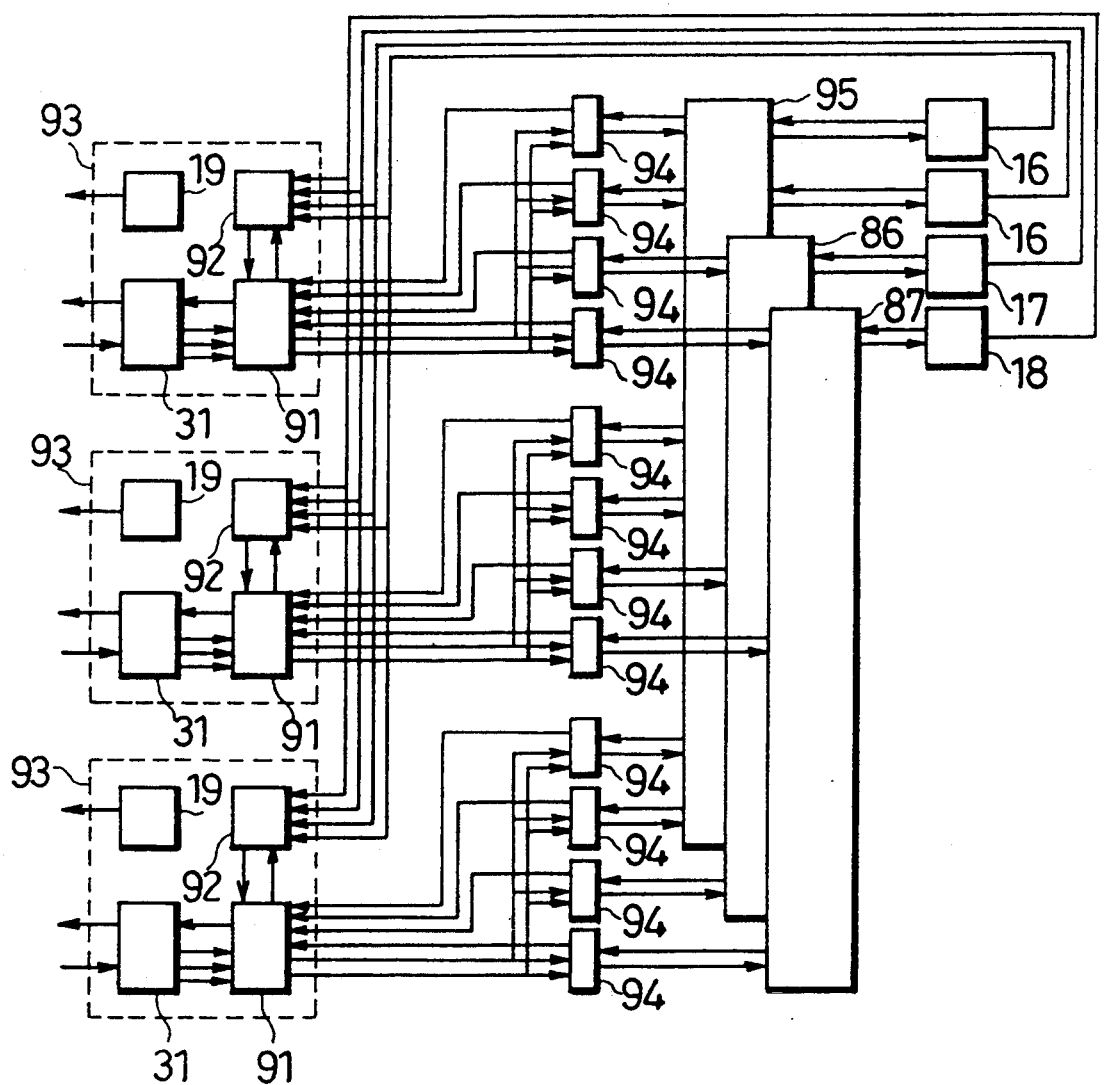
FIG. 10 shows a construction of another embodiment of the information processor of the present invention.

In FIG. 10, there are program counters 19, instruction fetch units 31, decode units 91, dependency analysis units 92, instruction stand-by units 94, and instruction schedule units 95, 86, and 87. Function execution units 16–18 are referred to as integer operation units, a floating-point operation unit, and a load/store unit respectively in this embodiment. Each portion 93 is referred to as an instruction setup unit comprising a set of the instruction fetch unit 31, the decode unit 91, the dependency analysis unit 92, and the program counter 19.

This embodiment is characterized by enlarged instruction issuing of each instruction stream of the information processor shown in FIG. 9 by the use of the superscalar technique. The component 31, 16–18, and 86–87 in FIG. 10 are respectively the same as the one in FIG. 4, the ones in FIG. 3 and the ones in FIG. 9. Therefore, the following description is focused on the operation different from the previous embodiments.

The information processor shown in FIG. 10 has enlarged instruction stand-by units and instruction schedule units, according as the instruction setup units 83 of the information processor shown in FIG. 9 is replaced by the super scaler instruction setup units 93. The decode units 91 issue up to two instructions to be executed to the instruction stand-by units 94 in parallel, check whether there is any vacant instruction stand-by unit corresponding to the type of the decoded instruction, and output the decoded results to the unit 94, if any. When there are previous results left in the destination unit of the instruction stand-by units 94, it has to wait to be outputted. When neither instructions can be issued, the instruction pipelines are interlocked. In this embodiment, two instruction stand-by units 94 for integer operation are provided, instructions for integer operation can be issued to either vacant unit. Which unit is vacant can be judged by the receiving state signal from the instruction schedule units 95, 86, and 87.

The dependency analysis units 92 not related with the essential operation of this embodiment, has a construction of enlarged dependency analysis units 82 shown in FIG. 9 in accordance with the multi-instruction issue in the decode units 91 and execute dependency analysis for multiple instructions in parallel upon request of the units 91.

The operation of the instruction stand-by units 94, compared with that of the instruction stand-by units 84 of a previous embodiment, has an additional function of selecting one of the two instructions outputted from the decode units 91 by adding one more input port from the decode units 91. This is because the instruction setting signals of both ports never become 1 at the same time because the decode units 91 can match each instruction with each instruction stand-by unit. The instruction schedule unit 95 has six sets of interface ports with the instruction stand-by units 94. This is not essential change in logical function but the increase of the number of the input/output ports to the instruction schedule unit 85 and of the physical size. Fixed priority is preassigned to the input ports of instructions, so that when the number of inputted instructions is beyond the capacity (i.e. 2) of the function execution units, instructions with lower priority have to wait.

According to this embodiment, the characteristics of processing multiple instruction streams in parallel can be maintained and the time required to process one instruction stream can be shortened by providing multiple instruction setup units for issuing multiple instructions per cycle, providing the instruction schedule units for scheduling and assigning the instructions(operational directives) outputted from each of the instruction setup units to each corresponding function execution unit between the instruction setup units and the function execution units, and providing multiple instruction stand-by units for temporarily storing instructions (operational directives) outputted from the instruction setup units, between the instruction setup units and the instruction schedule units so that one or more than one instruction stand-by units can correspond to each instruction setup/schedule units.

<Embodiment 12>

In FIG. 10, there are program counters 19, instruction fetch units 11, decode units 101, dependency analysis units 82, and instruction storing units 103–104. Function execution units 16–18 are referred to as integer operation units, a floating-point operation unit, and a load/store unit respectively in this embodiment. Each portion 102 is referred to as an instruction setup unit comprising a set of the instruction fetch unit 11, the decode unit 101, the dependency analysis unit 82, and the program counter 19. The information processor of this embodiment is constructed by adding instruction storing function to the instruction schedule units 85–87 and by eliminating the instruction stand-by units 84 in the information processor shown in FIG. 9.

The operation of the information processor having the above construction is described with reference to FIG. 11 and Tables 10–12 as follows.

Figure 11:
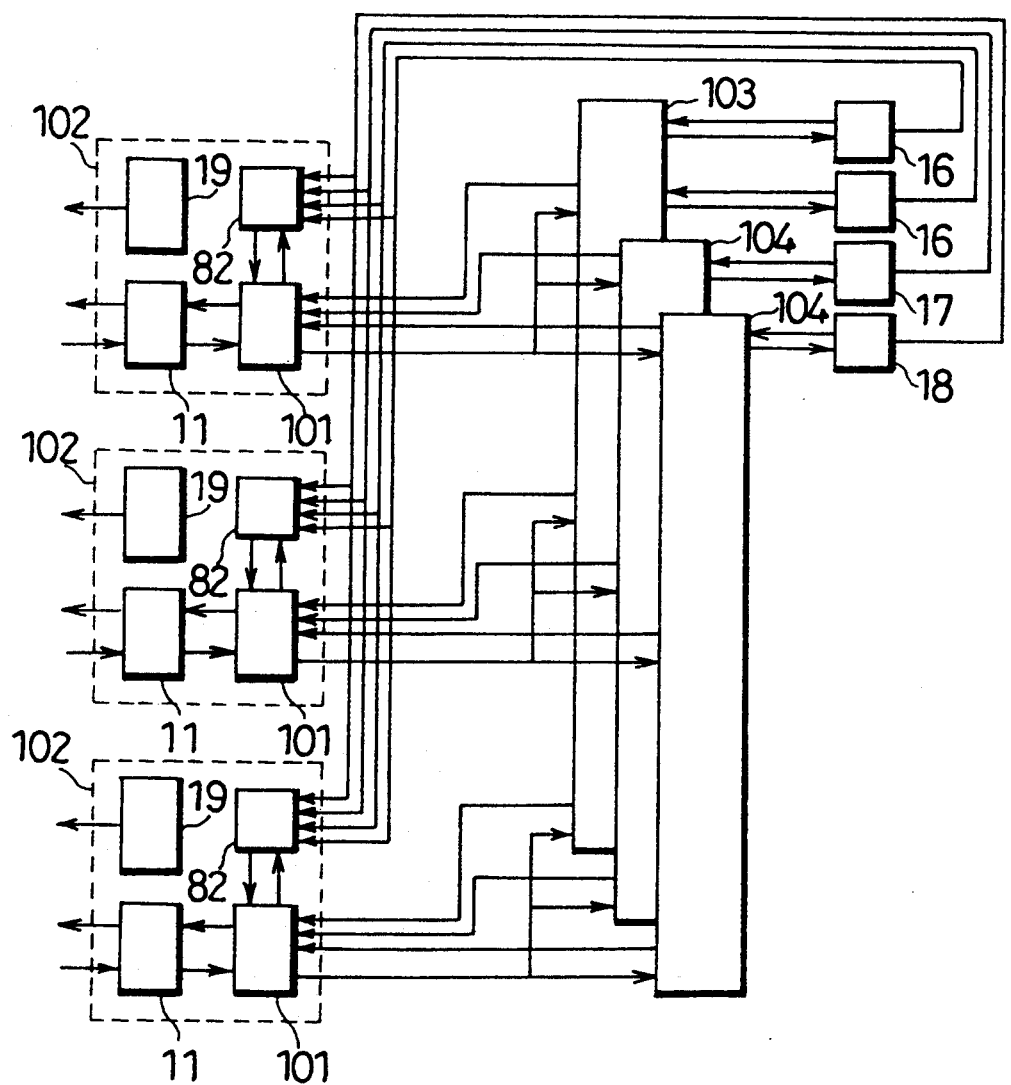
FIG. 11 shows a construction of another embodiment of the information processor of the present invention.

The component 11 and 16–18, and 82 in FIG. 11 are respectively the same as the ones in FIG. 3 and the one in FIG. 9. Therefore, the following description is focused on the operation of the decode units 101 and the instruction storing units 103–104.

The decode units 101 check whether the instruction storing units 103–104 corresponding to the type of the decoded instruction can accept them or not before outputting them, and output them to the units 103–104 if they can. Otherwise, the units 101 interlock the instruction pipelines and wait to be accepted.

More precisely, the decode units 101 find whether the instruction stand-by units 103–104 can accept instructions (operational directive) or not by the inputted receiving state signal D therefrom. When the value is 0, the units 101 output the instructions outputted in the previous cycle again. The units 101 output operational directive information C and an instruction existence signal E which are the decoded results. The instruction storing units 103–104 find whether effective operational directive information C is outputted from the units 101 by checking the signal E.

The operation of the instruction storing units 103–104 is described as follows.

The units 103–104 are inputted instructions (operational directives) from the decode units 101 and output them to each of the function execution units 16–18. In this embodiment having three instruction setup units 102, up to three instructions can be inputted in one cycle. However, it is impossible to output all the inputted instructions in parallel to the function execution units 16–18 because the numbers of the output ports of the instruction storing units 103 and 104 are respectively two and one. Therefore, the units 103–104 have the function of storing inputted instructions. The units 103–104 are inputted operational directive information C and an instruction existence signal E from the decode units 101, and output a receiving state signal D. On the other hand, the units 101 are inputted an initiating request signal R and output operational directive information V to the function execution units 16–18. These signals are the same as those mentioned in Embodiment 1.

The following is a description of the storing function of the instruction storing units 103–104.

Like in the instruction storing units 42–44 of the embodiment shown in FIG. 5, in the instruction storing units 103–104 of this embodiment, all the stored instructions (operational directive information) are assigned priorities. The information stored in the units 103–104 in an earlier cycle is "ahead" in the order of the one stored in a later cycle. Also, among up to three pieces of such information inputted in a cycle, the one inputted from the instruction setup unit 102 of No. 0 is "ahead" of the one of No. 1 followed by the one of No. 2.

The operation of the instruction storing units 104 is described in detail as follows.

Table 10 shows the state transition of the internal of the instruction storing unit 104 for load/store.

TABLE 10

| E[0] | E[1] | E[2] | R | S[t] | S[t + 1] |
|---|---|---|---|---|---|
| 0 | 0 | 0 | 0 | $\sigma$[0, 1, 2, 3, 4] | S[t] |
| 0 | 0 | 0 | 1 | 0 | 0 |
| 0 | 0 | 0 | 1 | $\sigma$[1, 2, 3, 4] | S[t] − 1 |
| $\alpha$[0] | $\alpha$[0] | $\alpha$[0] | 0 | $\sigma$[0, 1, 2, 3] | S[t] + 1 |
| $\alpha$[0] | $\alpha$[0] | $\alpha$[0] | 0 | 4 | 4 |
| $\alpha$[0] | $\alpha$[0] | $\alpha$[0] | 1 | 0 | 1 |
| $\alpha$[0] | $\alpha$[0] | $\alpha$[0] | 1 | $\sigma$[1, 2, 3, 4] | S[t] |
| $\beta$[0] | $\beta$[0] | $\beta$[0] | 0 | $\sigma$[0, 1, 2] | S[t] + 2 |
| $\beta$[0] | $\beta$[0] | $\beta$[0] | 0 | $\sigma$[3, 4] | 4 |
| $\beta$[0] | $\beta$[0] | $\beta$[0] | 1 | 0 | 2 |
| $\beta$[0] | $\beta$[0] | $\beta$[0] | 1 | $\sigma$[1, 2, 3] | S[t] + 1 |
| $\beta$[0] | $\beta$[0] | $\beta$[0] | 1 | 4 | 4 |
| 1 | 1 | 1 | 0 | $\sigma$[0, 1] | S[t] + 3 |
| 1 | 1 | 1 | 0 | $\sigma$[2, 3, 4] | 4 |
| 1 | 1 | 1 | 1 | 0 | 3 |
| 1 | 1 | 1 | 1 | $\sigma$[1, 2] | S[t] + 2 |
| 1 | 1 | 1 | 1 | $\sigma$[3, 4] | 4 |

The instruction storing unit 104 has to manage the storing condition of the operational directive information as the internal state. The unit 104, which has no relation with the contents of such information, has to determine each operation taking the relation between the information storing space as hardware and the number of pieces of such information into consideration. S[t] indicates the storing number of pieces of operational directive information in the cycle t. S[t+1] indicates the state in the next cycle of the instruction storing unit 104 in the state of S[t] after the values E[k] and R are inputted. $\sigma$ in the column of S[t] indicates that any value in the bracket will do. As apparent from this table, in this embodiment, the maximum storing number of operational directive information in the unit 104 is four.

E[k] indicates the instruction existence signal inputted from the instruction setup unit of No. k. The value 1 indicates that instruction input is requested, and the value 0 indicates that it is not. The possible combination for ($\alpha$[0], $\alpha$[1], $\alpha$[2]) is either (1, 0, 0), (0, 1, 0), or (0, 0, 1). Also, the possible combination for ($\beta$[0], $\beta$[1], $\beta$[2]) is either (1, 1, 0), (0, 1, 1) or (1, 0, 1). R is an initiating request signal from the function execution unit 18. The value 1 indicates the unit 18 can accept operational The above mentioned operation is of the instruction storing unit 104 for load/store. The one of the unit 104 for floating-point operation is the same. Assuming that R is always 1 from the characteristics of the floating-point operation unit 17, the case that R=0 in Tables 10 and 11 can be omitted.

The operation of the instruction storing unit 103 is described in detail as follows.

Table 12 shows the state transition of the internal state in the unit 103 and the correspondence of inputted values and outputted values.

TABLE 12

| E[0] | E[1] | E[2] | S[t] | S[t + 1] | D[0] | D[1] | D[2] | V[0] | V[1] |
|---|---|---|---|---|---|---|---|---|---|
| 0 | 0 | 0 | 0 | 0 | 1 | 1 | 1 | = | = |
| 0 | 0 | 0 | 1 | 0 | 1 | 1 | 1 | Q0 | = |
| 0 | 0 | 0 | $\sigma$[2, 3, 4, 5, 6, 7, 8] | S[t] − 2 | 1 | 1 | 1 | Q0 | Q1 |
| $\alpha$[0] | $\alpha$[0] | $\alpha$[0] | 0 | 1 | 1 | 1 | 1 | = | = |
| $\alpha$[0] | $\alpha$[0] | $\alpha$[0] | 1 | 1 | 1 | 1 | 1 | Q0 | = |
| $\alpha$[0] | $\alpha$[0] | $\alpha$[0] | $\sigma$[2, 3, 4, 5, 6, 7, 8] | S[t] − 2 | 1 | 1 | 1 | Q0 | Q1 |
| $\beta$[0] | $\beta$[0] | $\beta$[0] | 0 | 2 | 1 | 1 | 1 | = | = |
| $\beta$[0] | $\beta$[0] | $\beta$[0] | 1 | 2 | 1 | 1 | 1 | Q0 | = |
| $\beta$[0] | $\beta$[0] | $\beta$[0] | $\sigma$[2, 3, 4, 5, 6, 7, 8] | S[t] | 1 | 1 | 1 | Q0 | Q1 |
| 1 | 1 | 1 | 0 | 3 | 1 | 1 | 1 | = | = |
| 1 | 1 | 1 | 1 | 3 | 1 | 1 | 1 | Q0 | = |
| 1 | 1 | 1 | $\sigma$[2, 3, 4, 5, 6, 7] | S[t] − 1 | 1 | 1 | 1 | Q0 | Q1 |
| 1 | 1 | 1 | 8 | 8 | 1 | 1 | 0 | Q0 | Q1 | directive information, and the value 0 indicates it can not. When the value of the signal R is 1 and S[t] is not 0, the instruction storing unit 104 outputs the information V stored inside to the unit 18. Among the stored information, the one "ahead" of the others in the order defined before is selected.

Table 11 shows the values of the initiating request signal R and the instruction existence signal E[k] inputted and the values of the outputted receiving state signal D[k] corresponding to the internal state. The internal state stood for just S because there is no need to take the difference in cycles of time into consideration is the same as S[t] in Table 10. D[k] represents the receiving state signal outputted to the instruction setup unit 102 of No. k.

TABLE 11

| E[0] | E[1] | E[2] | R | S | D[0] | D[1] | D[2] |
|---|---|---|---|---|---|---|---|
| 1 | 1 | 1 | 0 | 2 | 1 | 1 | 0 |
| 1 | 1 | 0 | 0 | 3 | 1 | 0 | 1 |
| 1 | 0 | 1 | 0 | 3 | 1 | 1 | 0 |
| 0 | 1 | 1 | 0 | 3 | 1 | 1 | 0 |
| 1 | 1 | 1 | 0 | 3 | 1 | 0 | 0 |
| 1 | 1 | 1 | 1 | 3 | 1 | 1 | 0 |
| 1 | 0 | 0 | 0 | 4 | 0 | 1 | 1 |
| 0 | 1 | 0 | 0 | 4 | 1 | 0 | 1 |
| 0 | 0 | 1 | 0 | 4 | 1 | 1 | 0 |
| 1 | 1 | 0 | 0 | 4 | 0 | 0 | 1 |
| 1 | 0 | 1 | 0 | 4 | 0 | 1 | 0 |
| 0 | 1 | 1 | 0 | 4 | 1 | 0 | 0 |
| 1 | 1 | 0 | 1 | 4 | 1 | 0 | 1 |
| 1 | 0 | 1 | 1 | 4 | 1 | 1 | 0 |
| 0 | 1 | 1 | 1 | 4 | 1 | 1 | 0 |
| 1 | 1 | 1 | 0 | 4 | 0 | 0 | 0 |
| 1 | 1 | 1 | 1 | 4 | 1 | 0 | 0 |

The value of D[k] is omitted because in the combination of E[k], R, and S other than this table, it is always 1.

Thus, the values shown in this table are over four, and some of the instructions are rejected. In this embodiment, the operational directive information from the instruction setup unit 102 of No. 0 has higher priority in acceptance than the one from No. 1, and the one form No. 1 has higher priority than the one from No. 2.

V[0] and V[1] are respectively operational directive information outputted to the integer operation units 16 of No. 0 and No. 1. Q0 and Q1 represent the first and the second pieces of information in the order at that point stored in the instruction storing unit 103. The symbol "=" indicates that such information is not outputted. In this table, the maximum storing number of the operational directive information is eight, and the initiating request signal R from the two integer operation units is made two from the characteristics of the integer operation unit 16.

According to this embodiment, an information processor having a large number of instruction stand-by units and function execution units with high utilization can be easily implemented without making the construction of the instruction schedule units complicated, by providing multiple instruction setup units, and providing the instruction storing units for each function execution unit group for temporarily storing instructions(operational directives) outputted from each of the instruction setup units and for scheduling them to assign to each function execution unit, between the instruction setup units and the function execution units.

<Embodiment 13>

Figure 12:
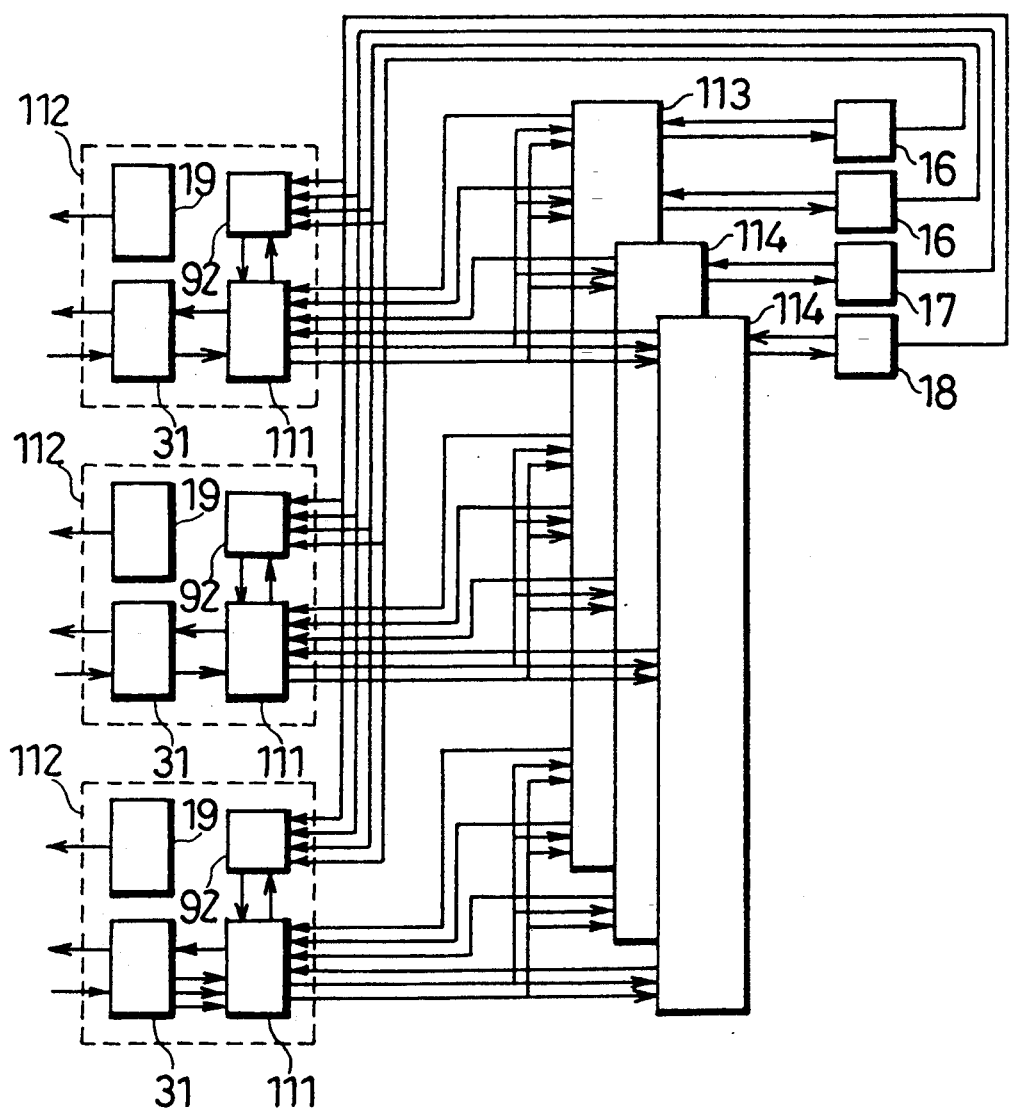
FIG. 12 shows a construction of another embodiment of the information processor of the present invention.

In FIG. 12, there are program counters 19, instruction fetch units 31, decode units 111, dependency analysis units 92, instruction storing units 113–114, function execution units 16–18. Each portion 112 is referred to as an instruction setup unit comprising a set of the instruction fetch unit 31, the decode unit 111, the dependency analysis unit 92, and the program counter 19. This embodiment is characterized by enlarged instruction issuing of each instruction stream of the information processor shown in FIG. 11 by the use of the super-scalar technique. The component 31, 16–18, and 92 in FIG. 12 are respectively the same as the one in FIG. 4, the ones in FIG. 3 and the one in FIG. 10. Therefore, the following description is focused on the operation different from the previous embodiments.

The information processor shown in FIG. 12 has enlarged instruction stand-by units and instruction schedule units according as the instruction setup units 102 of the information processor shown in FIG. 11 are replaced by the super scaler instruction setup units 112.

The decode units 111 issue up to two instructions to be executed to the instruction stand-by units 113-114 in parallel, check whether there is any vacant instruction stand-by unit corresponding to the type of the decoded instruction, and output the decoded results to the units 113-114, if any. When the destination unit of the units 113-114 can not accept it, it has to wait to be outputted. When neither instructions can be issued, the instruction pipelines are interlocked. In this embodiment, each of the instruction setup unit 112 are provided with interfaces with the instruction storing unit 113 for integer operation, up to two instructions for integer operation can be issued in parallel.

The operation of the instruction storing units 114, compared with that of the instruction storing units 104 of the embodiment shown in FIG. 11, has an additional function of selecting one of the two instructions outputted from the decode units 111 by adding one more input port from the decode units 111. This is because the instruction existing signals of both ports composing a set of input interfaces never become 1 at the same time because the decode units 111 can match each instruction with each instruction storing unit.

The instruction storing unit 113, like the unit 114, has six sets of input interface multi-ports with the decode units 111. This is not essential change in logical function but the increase of the number of the input/output ports to the instruction storing unit 103 and of the physical size. Fixed priority is preassigned to the input ports of instructions, so that when the number of instructions inputted from the decode units 111 is beyond the storing capacity of the instruction storing units 114, instructions with lower priority are rejected.

According to this embodiment, the characteristics of processing multiple instruction streams in parallel can be maintained and the time required to process one instruction stream can be shortened by providing multiple instruction setup units for issuing multiple instructions per cycle, providing the instruction storing units for each function execution unit group for temporarily storing the instructions(operational directives) outputted from each of the instruction setup units and scheduling to assign them to each corresponding function execution unit, between the instruction setup units and the function execution units.

<Embodiment 14>

Figure 13:
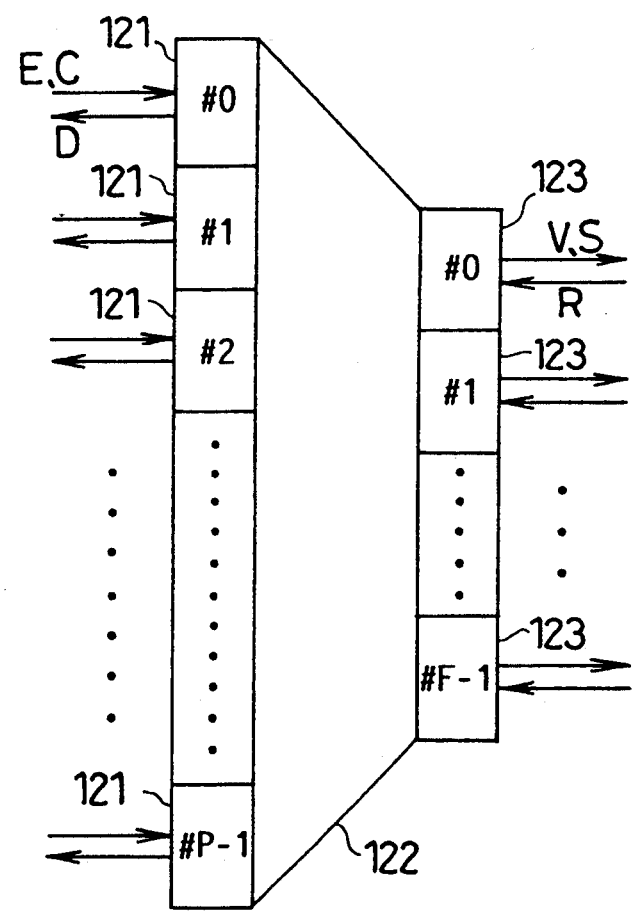
FIG. 13 shows the operational timing of the instruction stand-by unit in the first embodiment to this invention and the first embodiment of the invention shown in FIG. 7.

In FIG. 13 showing the construction of an instruction scheduler, there are P instruction input units 121 of from No. 0 to No. P−1, an instruction selection unit 122, and F instruction output units 123 of from No. 0 to No. F−1. The instruction scheduler shows the general construction of the instruction schedule units described in the previous embodiments.

The operation of an instruction scheduler of this invention is described in brief as follows.

The instruction input units 121 are inputted an instruction existence signal E and an instruction C from outside and output the receiving state signal D indicating the received result of the instruction. The instruction output units 123 are inputted an initiating request signal R from outside and output the instruction V and the initiating signal S. The instruction selection unit 122 selects up to F (P≧F) among up to P pieces of instructions inputted from the instruction input units 121. The instructions outputted from the instruction output units 123 are the ones selected in the instruction select unit 122.

The following is a description of each signal mentioned above.

The instruction scheduler carrying out mere operation of input/output has no relation with the contents of either the instruction C the instruction input units 121 input or of the instruction V the instruction output units 123 output. The instruction existence signal E composed of a 1 bit signal line indicates whether the instruction C is effective or not. In this embodiment, when the signal E is 1, the instruction C is effective, and when the signal E is 0, the instruction C is invalid with no instruction output.

The receiving state signal D indicates whether the instruction C is selected in the unit 122 and outputted from the instruction output unit 123 or not. The instruction input units 121 inputted instructions in every cycle, cannot be inputted the next instruction until the inputted instruction C is selected in the instruction selection unit 122. The receiving state signal D is used to prevent the previous instruction passed by the next one from being lost. The value 0 of the signal D indicates that the inputted instruction C was not selected in the unit 122. In such a case, the next instruction can not be outputted by the instruction input units 121. On the other hand, the value 1 of the signal D indicates either the inputted instruction C is selected in the unit 122 or the instruction input unit 121 was not inputted an effective instruction in the previous cycle. Here, Y can output the next instruction to the instruction input units 121 from outside.

The operation of the instruction select unit 122 is described in detail as follows.

Table 13 shows the operation of the unit 122 when P and F are respectively three and one. S[t] represents the internal state of the unit 122 in the cycle t.

TABLE 13

| S[t] | E[0] | E[1] | E[2] | R | S[t + 1] | D[0] | D[1] | D[2] | V |
|------|------|------|------|---|----------|------|------|------|---|
| *    | 0    | 0    | 0    | 1 | S[t]     | 1    | 1    | 1    | = |
| 0    | 1    | *    | *    | 1 | 1        | 1    | e[1] | e[2] | C[0] |
| 0    | 0    | 1    | *    | 1 | 2        | 1    | 1    | e[2] | C[1] |
| 0    | 0    | 0    | 1    | 1 | 0        | 1    | 1    | 1    | C[2] |
| 1    | *    | 1    | *    | 1 | 2        | e[0] | 1    | e[2] | C[1] |
| 1    | *    | 0    | 1    | 1 | 0        | e[0] | 1    | 1    | C[2] |
| 1    | 1    | 0    | 0    | 1 | 1        | 1    | 1    | 1    | C[0] |
| 2    | *    | *    | 1    | 1 | 0        | e[0] | e[1] | 1    | C[2] |
| 2    | 1    | *    | 0    | 1 | 1        | 1    | e[1] | 1    | C[0] |
| 2    | 0    | 1    | 0    | 1 | 2        | 1    | 1    | 1    | C[1] |
| *    | *    | *    | *    | 0 | S[t]     | e[0] | e[1] | e[2] | = |

The internal state of the unit 122 is either 0, 1, or 2 which corresponds to the number of the instruction input units 121. The symbol "*" in the column of S[t] indicates that the value can be any of the three states. E[k] and R respectively indicate the instruction existence signal inputted in the instruction input unit 121 of No. k, and the initiating request signal inputted at the instruction output units 123. The symbol "*" in the column of E[k] indicates that the value can be either 0 or 1. The state of the instruction select unit 122 is changed to the state appeared as S in the next cycle by the input of these E[k] and R. Here, the receiving state signal outputted from the instruction input unit 121 of No. k is D[k], and the instruction outputted from the instruction output units 123 is V. e[k] in the column of D[k] represents the logical denial of E[k], or when E[k]

is 1, e[k] is 0 and vice versa. C[k] in the column of V indicates the contents of the instruction inputted in the instruction input unit 121 of No. k which tells the number of the instruction input unit 121 whose instruction the instruction selection unit 122 selects. When C[k] on the instruction selection unit 122 from Embodiment 14.

Table 14 shows the operation of the unit 122 in Embodiment 15 only in different points from Embodiment 14.

TABLE 14

| S[t] | E[n~n + 5]         | R | S[t + 1] | D[n~n + 5]                                          | V[0], V[1]         |
|------|--------------------|---|----------|-----------------------------------------------------|--------------------|
| n    | *, *, *, *, *, *   | 0 | S[t]     | e[n], e[n + 1], e[n + 2], e[n + 3], e[n + 4], e[n + 5] | =               |
| n    | 1, *, *, *, *, *   | 1 | n + 1    | 1, e[n + 1], e[n + 2], e[n + 3], e[n + 4], e[n + 5] | C[n]               |
| n    | 0, 1, *, *, *, *   | 1 | n + 2    | 1, 1, e[n + 2], e[n + 3], e[n + 4], e[n + 5]        | C[n + 1]           |
| n    | 0, 0, 1, *, *, *   | 1 | n + 3    | 1, 1, 1, e[n + 3], e[n + 4], e[n + 5]               | C[n + 2]           |
| n    | 0, 0, 0, 1, *, *   | 1 | n + 4    | 1, 1, 1, 1, e[n + 4], e[n + 5]                      | C[n + 3]           |
| n    | 0, 0, 0, 0, 1, *   | 1 | n + 5    | 1, 1, 1, 1, 1, e[n + 5]                             | C[n + 4]           |
| n    | 0, 0, 0, 0, 0, 1   | 1 | n        | 1, 1, 1, 1, 1, 1                                    | C[n + 5]           |
| n    | 0, 0, 0, 0, 0, 0   | 1 | n        | 1, 1, 1, 1, 1, 1                                    | =                  |
| n    | 1, 1, *, *, *, *   | 2 | n + 2    | 1, 1, e[n + 2], e[n + 3], e[n + 4], e[n + 5]        | C[n], C[n + 1]     |
| n    | 1, 0, 1, *, *, *   | 2 | n + 3    | 1, 1, 1, e[n + 3], e[n + 4], e[n + 5]               | C[n], C[n + 2]     |
| n    | 1, 0, 0, 1, *, *   | 2 | n + 4    | 1, 1, 1, 1, e[n + 4], e[n + 5]                      | C[n], C[n + 3]     |
| n    | 1, 0, 0, 0, 1, *   | 2 | n + 5    | 1, 1, 1, 1, 1, e[n + 5]                             | C[n], C[n + 4]     |
| n    | 1, 0, 0, 0, 0, 1   | 2 | n + 1    | 1, 1, 1, 1, 1, 1                                    | C[n], C[n + 5]     |
| n    | 1, 0, 0, 0, 0, 0   | 2 | n + 1    | 1, 1, 1, 1, 1, 1                                    | C[n]               |
| n    | 0, 1, 1, *, *, *   | 2 | n + 3    | 1, 1, 1, e[n + 3], e[n + 4], e[n + 5]               | C[n + 1], C[n + 2] |
| n    | 0, 1, 0, 1, *, *   | 2 | n + 4    | 1, 1, 1, 1, e[n + 4], e[n + 5]                      | C[n + 1], e[n + 3] |
| n    | 0, 1, 0, 0, 1, *   | 2 | n + 5    | 1, 1, 1, 1, 1, e[n + 5]                             | C[n + 1], e[n + 4] |
| n    | 0, 1, 0, 0, 0, 1   | 2 | n        | 1, 1, 1, 1, 1, 1                                    | C[n + 1], e[n + 5] |
| n    | 0, 1, 0, 0, 0, 0   | 2 | n + 2    | 1, 1, 1, 1, 1, 1                                    | C[n + 1]           |
| n    | 0, 0, 1, 1, *, *   | 2 | n + 4    | 1, 1, 1, 1, e[n + 4], e[n + 5]                      | C[n + 2], C[n + 3] |
| n    | 0, 0, 1, 0, 1, *   | 2 | n + 5    | 1, 1, 1, 1, 1, e[n + 5]                             | C[n + 2], C[n + 4] |
| n    | 0, 0, 1, 0, 0, 1   | 2 | n        | 1, 1, 1, 1, 1, 1                                    | C[n + 2], C[n + 5] |
| n    | 0, 0, 1, 0, 0, 0   | 2 | n + 3    | 1, 1, 1, 1, 1, 1                                    | C[n + 2]           |
| n    | 0, 0, 0, 1, 1, *   | 2 | n + 5    | 1, 1, 1, 1, 1, e[n + 5]                             | C[n + 3], C[n + 4] |
| n    | 0, 0, 0, 1, 0, 1   | 2 | n        | 1, 1, 1, 1, 1, 1                                    | C[n + 3], C[n + 5] |
| n    | 0, 0, 0, 1, 0, 0   | 2 | n + 4    | 1, 1, 1, 1, 1, 1                                    | C[n + 3]           |
| n    | 0, 0, 0, 0, 1, 1   | 2 | n        | 1, 1, 1, 1, 1, 1                                    | C[n + 4], C[n + 5] |
| n    | 0, 0, 0, 0, 1, 0   | 2 | n + 5    | 1, 1, 1, 1, 1, 1                                    | C[n + 4]           |
| n    | 0, 0, 0, 0, 0, 1   | 2 | n        | 1, 1, 1, 1, 1, 1                                    | C[n + 5]           |
| n    | 0, 0, 0, 0, 0, 0   | 2 | n        | 1, 1, 1, 1, 1, 1                                    | =                  | appears on the V column, the value of the initiating signal S is 1, and when the symbol "=" appears on it, the value is 0. The latter indicates either the instruction selection unit 122 did not select either of them, or all the instruction input units 121 were not inputted any instructions.

The internal state of the instruction selection unit 122 of the instruction scheduler of this embodiment indicates the number of the instruction input unit 121 whose instruction is selected with priority in the next selection. When the internal state S is 0, instructions inputted from the instruction input units 121 of No. 0, 1, and 2 are selected with higher priority in the order. When the internal state S is 1, instructions inputted from the units of No. 2, 1, and 0 are selected with higher priority in the order. Consequently, when the instruction from the unit 121 of No. m is selected, the instruction from the unit 121 of No. m+1 has the highest priority in the remainder calculation of P(=3) in the next.

According to this embodiment, instructions can be selected fairly from all the instruction input units by providing instruction selection units which memorize the number of the group in which the selected instruction was inputted when one instruction selected from among three instruction input units is outputted through one instruction output unit, and lowers the priority of the previously selected instruction in the next selection.

<Embodiment 15>

In this embodiment, the values of P and F of Embodiment 14 have changed to six and two respectively. Since the operation of the instruction input units 121 and the instruction output units 123 are the same as that of Embodiment 14, the following description is focused The internal state S[t] takes one of six states: 0, 1, 2, 3, 4, and 5 according to the increase of the number (P) of the instruction input units 121. n in the column of S[t] is any of them.

E[n~n+5] represents the combination of E[n], E[n+1], E[n+2], E[n+3], E[n+4], and E[n+5]. Here, n+k means addition in the system of residues having 3 as modulo. For example, when the value of n is 2, the values in the column of E[n~n+5] become E[2], E[3], E[4], E[5], E[0], and E[1] in the order. E[m], the column of D[n~n+5], e[n], and C[n] mean the same as the ones in Embodiment 14. n+k in the column of S[t+1] means addition in the system of residues having 3 as modulo.

The values of the column of R, which is for convenience, indicate the number of the instruction output unit 123 inputted the value of 1 as initiating request signal.

V[k] represents the instruction outputted from the instruction output unit 123 of No. k. The value 1 of R indicates that the instructions appeared in the column (V[0] and V[1]) are outputted from the units 123 which was inputted the value of 1 as the initiating request signal. The value of 2 of R indicates that although both of the units 123 output instructions, if only one instruction appears on (V[0] and V[1]), V[0] outputs the instruction. The symbol "=" means that neither V[0] nor V[1] outputs it. According to this embodiment, like Embodiment 14, instructions of all the instruction input units can be selected fairly even if there are multiple instruction output units.

<Embodiment 16>

Since this embodiment differs from Embodiment 14 only in the operation of the instruction selection unit 122, the following description is focused on it. Table 15 shows the operation of the instruction selection unit 122, in which the transition of the internal state is a little different from that of Embodiment 1.

TABLE 15

| S[t] | E[0] | E[1] | E[2] | R | S[t + 1] | D[0] | D[1] | D[2] | V |
|---|---|---|---|---|---|---|---|---|---|
| * | 0 | 0 | 0 | 1 | S[t] | 1 | 1 | 1 | = |
| 0 | 1 | 1 | * | 1 | 1 | 1 | 0 | e[2] | C[0] |
| 0 | 1 | 0 | 1 | 1 | 2 | 1 | 1 | 0 | C[0] |
| 0 | 1 | 0 | 0 | 1 | 1 | 1 | 1 | 1 | C[0] |
| 0 | 0 | 1 | * | 1 | 2 | 1 | 1 | e[2] | C[1] |
| 0 | 0 | 0 | 1 | 1 | 0 | 1 | 1 | 1 | C[2] |
| 1 | * | 1 | 1 | 1 | 2 | e[0] | 1 | 0 | C[1] |
| 1 | 1 | 1 | 0 | 1 | 0 | 0 | 1 | 1 | C[1] |
| 1 | 0 | 1 | 0 | 1 | 2 | 1 | 1 | 1 | C[1] |
| 1 | * | 0 | 1 | 1 | 0 | e[0] | 1 | 1 | C[2] |
| 1 | 1 | 0 | 0 | 1 | 1 | 1 | 1 | 1 | C[0] |
| 2 | 1 | * | 1 | 1 | 0 | 0 | e[1] | 1 | C[2] |
| 2 | 0 | 1 | 1 | 1 | 1 | 1 | 0 | 1 | C[2] |
| 2 | 0 | 0 | 1 | 1 | 0 | 1 | 1 | 1 | C[2] |
| 2 | 1 | * | 0 | 1 | 1 | 1 | e[1] | 1 | C[0] |
| 2 | 0 | 1 | 0 | 1 | 2 | 1 | 1 | 1 | C[1] |
| * | * | * | * | 0 | S[t] | e[0] | e[1] | e[2] | = |

When S[t] is 0 in cycle t and E[0], E[1], and E[2] are 1, 0, and 1 respectively, the internal state is transitted to 1 in Embodiment 14, however, it is transitted to 2 in this embodiment. When E becomes 1 in the next cycle t+1, the instruction inputted in the instruction input unit 121 of No. 1 in the cycle t+1 is selected with higher priority than that in the unit 121 of No. 2 in the cycle t in Embodiment 1. However, in this embodiment, the instruction inputted in the unit 121 in the cycle t has higher priority than that in the unit 121 of No. 1 in the cycle t+1.

Thus, this embodiment has higher impartiality in the selection of instructions than Embodiment 14.

<Embodiment 17>

Since this embodiment also differs from Embodiment 14 only in the operation of the instruction selection unit 122, the following description is focused on it. Table 16 shows the operation of the instruction selection unit 122, in which the transition of the internal state is a little different from that of Embodiment 1.

TABLE 16

| S[t] | E]0] | E[1] | E[2] | R | S[t + 1] | D[0] | D[1] | D[2] | V |
|---|---|---|---|---|---|---|---|---|---|
| * | 0 | 0 | 0 | * | S[t] | 1 | 1 | 1 | = |
| 0 | 1 | * | * | 1 | 0 | 1 | e[1] | e[2] | C[0] |
| 0 | 0 | 1 | * | 1 | 1 | 1 | 1 | e[2] | C[1] |
| 0 | 0 | 0 | 1 | 1 | 2 | 1 | 1 | 1 | C[2] |
| 0 | 1 | * | * | 0 | 0 | 0 | e[1] | e[2] | = |
| 0 | 0 | 1 | * | 0 | 1 | 1 | 0 | e[2] | = |
| 0 | 0 | 0 | 1 | 0 | 2 | 1 | 1 | 0 | = |
| 1 | * | 1 | * | 1 | 1 | e[0] | 1 | e[2] | C[1] |
| 1 | * | 0 | 1 | 1 | 2 | e[0] | 1 | 1 | C[2] |
| 1 | 1 | 0 | 0 | 1 | 0 | 1 | 1 | 1 | C[0] |
| 1 | * | 1 | * | 0 | 1 | e[0] | 0 | e[2] | = |
| 1 | * | 0 | 1 | 0 | 2 | e[0] | 1 | 0 | = |
| 1 | 1 | 0 | 0 | 0 | 0 | 0 | 1 | 1 | = |
| 2 | * | * | 1 | 1 | 2 | e[0] | e[1] | 1 | C[2] |
| 2 | 1 | * | 0 | 1 | 0 | 1 | e[1] | 1 | C[0] |
| 2 | 0 | 1 | 0 | 1 | 1 | 1 | 1 | 1 | C[1] |
| 2 | * | * | 1 | 0 | 2 | e[0] | e[1] | 0 | = |
| 2 | 1 | * | 0 | 0 | 0 | 0 | e[1] | 1 | = |
| 2 | 0 | 1 | 0 | 0 | 1 | 1 | 0 | 1 | = |

After an instruction is selected in one of the instruction input unit, the priority of instruction selection in the next cycle is given to another unit 121 in Embodiment 14. However, in this embodiment, as long as one of the unit 121 has successively inputted instructions, the priority is not given to another. The other units 121 cannot get the priority until the unit 121 has a vacant cycle.

According to this embodiment, successively inputted instructions into an instruction input unit are scheduled as a unit when such an operation is needed, which allows pretty impartial schedule of instructions.

Although the case that (P,F) is (3,1) and (6,2) is described in this embodiment, P and F may be set independently.

<Embodiment 18>

This embodiment has the construction shown in FIG. 9 except that its instruction schedule unit 86 for floating-point operation is replaced by the instruction scheduler shown in FIG. 13. Each of the instruction input units 121 of the instruction scheduler shown in FIG. 13 and each of the instruction stand-by units 84 is connected in order to connect the instruction output units 123 with the function execution unit 17.

According to this embodiment, instructions outputted from each of the instruction setup units can be sent to the function execution units fairly to be executed.

The object of this embodiment is to improve efficiency of each function execution unit by processing multiple instruction streams in parallel. Conversely, multiple instruction streams to be executed in parallel are needed in order to realize high-speed processing by the improvement of efficiency of each function execution unit. The instruction schedule unit of this embodiment, which schedule instructions from each instruction setup unit impartially, can restrain a particular instruction stream from finishing earlier than the others and keep enough supply rate of instructions, thereby preventing some of the units from becoming idle without instruction streams to process.

<Embodiment 19>

This embodiment has the construction shown in FIG. 9 except that its instruction schedule unit 87 for load/store is replaced by the instruction scheduler of Embodiment 17. Like Embodiment 18, each of the instruction input units 121 of the instruction scheduler shown in FIG. 13 and each of the instruction stand-by units 84 is connected in order to connect the instruction output units 123 with the function execution unit 18.

According to this embodiment, when instructions outputted from each of the instruction setup units are fairly sent to the function execution units to execute the instructions, instruction scheduling can be carried out taking the locality of reference of memory access into consideration, i.e., an access is usually close to the previous one.

In Embodiments 18 and 19, only the units 86 and 87 among the multiple instruction schedule units above mentioned are replaced by the instruction scheduler, however, any other schedule units can be used.

<Embodiment 20>

This embodiment has the construction shown in FIG. 10 except that its instruction schedule unit 95 for integer operation is replaced by the instruction scheduler of Embodiment 15. Each of the instruction input units 121 of the instruction scheduler shown in FIG. 13 and each of the instruction setup units 94 is connected in order to connect the instruction output units 123 with the function execution unit 16.

More precisely, the connection between each of the instruction input units 121 and each of the instruction stand-by units 94 is carried out as follows.

First, the instruction stand-by units 94 for integer operation are numbered. Two of the units 94 holding instructions of integer operation outputted from the instruction setup units 93 of No. m (m=0, 1, 2) are assigned 2×m and 2×m+1 as their numbers. Next, the instruction stand-by unit 94 numbered No. k is connected with the instruction input unit 121 numbered No. k.

According to this embodiment, instructions outputted from each instruction setup unit can be fairly sent per stream to the function execution units to be executed.

<Embodiment 21>

This embodiment also has the construction shown in FIG. 10 except that its instruction schedule unit 95 for integer operation is replaced by the instruction scheduler of Embodiment 15. This differs from Embodiment 20 in the connection between the instruction input units 121 and the instruction setup units 94. First, two of the units 94 holding instructions of integer operation outputted from the instruction setup units 93 of No. m (m=0, 1, 2) are assigned m and m+3 as their numbers. Next, the instruction stand-by unit 94 numbered No. k is connected with the instruction input unit 121 numbered No. k.

According to this embodiment, instructions outputted from each instruction setup unit can be fairly scheduled per instruction and sent to the function execution units to be executed unlike Embodiment 20 in which scheduling is carried out fairly per instruction stream.

In Embodiments 20 and 21, only the unit 95 for integer operation among multiple instruction schedule units above mentioned are replaced by the instruction scheduler, however, any other schedule units can be replaced.

<Embodiment 22>

This embodiment is described with reference to FIG. 13 whose components are described in Embodiment 14. The instruction scheduler of this embodiment, unlike that of Embodiment 14, divides the P instruction input units 121 into L instruction input groups numbering from 0 to L−1. When P=L×W, a group numbered j has W instruction input units 121 from No. W×j to W×(j+1)−1.

The operation of the instruction selection unit 122 of the instruction scheduler having the above construction is described with reference to Table 17. The operation of instruction input units 121 and instruction output units 123 is the same as that of Embodiments 14–17.

Table 17 shows the operation of the instruction selection unit 122 when L, W, and F are 3, 2, and 2 respectively (P=6).

TABLE 17

| S[t] | E[n~n + 5] | R | S[t + 1] | D[n~n + 5] | V[0], V[1] |
|---|---|---|---|---|---|
| m | *, *, *, *, *, * | 0 | S[t] | e[n], e[n + 1], e[n + 2], e]n + 3], e[n + 4], e [n + 5] | = |
| m | 1, 1, *, *, *, * | 1 | m + 1 | 1, 0, e[n + 2], e]n + 3], e[n + 4], e[n + 5] | C[n] |
| m | 1, 0, *, *, *, * | 1 | m + 1 | 1, 1, e[n + 2], e]n + 3], e[n + 4], e[n + 5] | C[n] |
| m | 0, 1, *, *, *, * | 1 | m + 1 | 1, 1, e[n + 2], e]n + 3], e[n + 4], e[n + 5] | C[n + 1] |
| m | 0, 0, 1, 1, *, * | 1 | m + 2 | 1, 1, 1, 0, e[n + 4], e [n + 5] | C[n + 2] |
| m | 0, 0, 1, 0, *, * | 1 | m + 2 | 1, 1, 1, 1, e[n + 4], e [n + 5] | C[n + 2] |
| m | 0, 0, 0, 1, *, * | 1 | m + 2 | 1, 1, 1, 1, e[n + 4], e [n + 5] | C[n + 3] |
| m | 0, 0, 0, 0, 1, 1 | 1 | m | 1, 1, 1, 1, 1, 0 | C[n + 4] |
| m | 0, 0, 0, 0, 1, 0 | 1 | m | 1, 1, 1, 1, 1, 1 | C[n + 4] |
| m | 0, 0, 0, 0, 0, 1 | 1 | m | 1, 1, 1, 1, 1, 1 | C[n + 5] |
| m | 0, 0, 0, 0, 0, 0 | 1 | m | 1, 1, 1, 1, 1, 1 | = |
| m | 1, 1, *, *, *, * | 2 | m + 1 | 1, 1, e[n + 2], e]n + 3], e[n + 4], e[n + 5] | C[n], C[n + 1] |
| m | 1, 0, 1, 1, *, * | 2 | m + 1 | 1, 1, 1, 0, e[n + 4], e [n + 5] | C[n], C[n + 2] |
| m | 0, 1, 1, 1, *, * | 2 | m + 1 | 1, 1, 1, 0, e[n + 4], e [n + 5] | C[n + 1], C[n + 2] |
| m | 1, 0, 1, 0, *, * | 2 | m + 2 | 1, 1, 1, 1, e[n + 4], e [n + 5] | C[n], C[n + 2] |
| m | 1, 0, 0, 1, *, * | 2 | m + 2 | 1, 1, 1, 1, e[n + 4], e [n + 5] | C[n], e[n + 3] |
| m | 0, 1, 1, 0, *, * | 2 | m + 2 | 1, 1, 1, 1, e[n + 4], e [n + 5] | C[n + 1], C[n + 2] |
| m | 0, 1, 0, 1, *, * | 2 | m + 2 | 1, 1, 1, 1, e[n + 4], e [n + 5] | C[n + 1], e[n + 3] |
| m | 1, 0, 0, 0, 1, 1 | 2 | m + 2 | 1, 1, 1, 1, 1, 0 | C[n], C[n + 4] |
| m | 0, 1, 0, 0, 1, 1 | 2 | m + 2 | 1, 1, 1, 1, 1, 0 | C[n + 1], e[n+ 4] |
| m | 1, 0, 0, 0, 1, 0 | 2 | m + 1 | 1, 1, 1, 1, 1, 1 | C[n], e[n+ 4] |
| m | 1, 0, 0, 0, 0, 1 | 2 | m + 1 | 1, 1, 1, 1, 1, 1 | C[n], e[n+ 5] |
| m | 0, 1, 0, 0, 1, 0 | 2 | m + 1 | 1, 1, 1, 1, 1, 1 | C[n]+ 1], C[n + 4] |
| m | 0, 1, 0, 0, 0, 1 | 2 | m + 1 | 1, 1, 1, 1, 1, 1 | C[n]+ 1], C[n + 5] |
| m | 1, 0, 0, 0, 0, 0 | 2 | m + 1 | 1, 1, 1, 1, 1, 1 | C[n] |
| m | 0, 1, 0, 0, 0, 0 | 2 | m + 1 | 1, 1, 1, 1, 1, 1 | C[n + 1] |
| m | 0, 0, 1, 1, *, * | 2 | m + 2 | 1, 1, 1, 1, e[n + 4], e [n + 5] | C[n + 2], C[n + 5] |
| m | 0, 0, 1, 0, 1, 1 | 2 | m + 2 | 1, 1, 1, 1, 1, 0 | C[n + 2], C[n + 4] |
| m | 0, 0, 0, 1, 1, 1 | 2 | m + 2 | 1, 1, 1, 1, 1, 0 | C[n + 3], C[n + 4] |
| m | 0, 0, 1, 0, 1, 0 | 2 | m | 1, 1, 1, 1, 1, 1 | C[n + 2], C[n + 4] |
| m | 0, 0, 1, 0, 0, 1 | 2 | m | 1, 1, 1, 1, 1, 1 | C[n + 2], C[n + 5] |
| m | 0, 0, 0, 1, 1, 0 | 2 | m | 1, 1, 1, 1, 1, 1 | C[n + 3], C[n + 4] |
| m | 0, 0, 0, 1, 0, 1 | 2 | m | 1, 1, 1, 1, 1, 1 | C[n + 3], C[n + 5] |
| m | 0, 0, 1, 0, 0, 0 | 2 | m + 1 | 1, 1, 1, 1, 1, 1 | C[n + 2] |
| m | 0, 0, 0, 1, 0, 0 | 2 | m + 1 | 1, 1, 1, 1, 1, 1 | C[n + 3] |
| m | 0, 0, 0, 0, 1, 1 | 2 | m | 1, 1, 1, 1, 1, 1 | C[n + 4], C[n + 5] |
| m | 0, 0, 0, 0, 1, 0 | 2 | m | 1, 1, 1, 1, 1, 1 | C[n + 4] |
| m | 0, 0, 0, 0, 0, 1 | 2 | m | 1, 1, 1, 1, 1, 1 | C[n + 5] |
| m | 0, 0, 0, 0, 0, 0 | 2 | m | 1, 1, 1, 1, 1, 1 | = |

The meanings of the symbols on Table 17 are the same as those on Table 14 except that this table has the relationship of n=m−2 (m represents the number of the instruction input groups). The internal state of the instruction selection unit 122 is either 0, 1, or 2 which corresponds to the number of the instruction input group.

The internal state of the unit 122 of the instruction scheduler of this embodiment indicates the number of the instruction input group whose instruction is selected with priority in the next instruction selection. In this embodiment, beginning from the instruction input group of the internal state, the instruction of the group whose number of inputted instructions is 2 is selected. When there is not the group, groups are selected which are found first and second among the groups whose numbers of inputted instructions is 1, beginning from the instruction input group in the internal state.

Such a selecting method generally can be enlarged by the following procedure. Beginning from the instruction input group in the internal state, the group that has the largest number of inputted instructions is selected and the maximum instructions to be outputted from the instruction output units 123 are selected therefrom. If there is still room to output, beginning from a next group, the group that has the second largest number of inputted instructions is selected to be outputted. This is repeated until there is no capacity left to output or all the inputted instructions are outputted. During the checking, if it has reached the instruction input group of No. L−1, the next checking is started with the group of No. 0.

According to this embodiment, instructions can be selected fairly from the instruction input units taking the request of instruction input into consideration by providing instruction selection units which give priority to the instructions which inputted to the instruction input unit in the instruction input group having the largest number of inputted instructions when up to two instructions selected from among six instruction input units consisting of three groups are outputted through two instruction output units, memorize the number of the group in which the selected instruction was inputted when there are groups having the same numbers of inputted instructions, and lowers the priority of the previously selected instruction in the next selection.

<Embodiment 23>

The operation of this embodiment is different from that of Embodiment 22.

Table 18 shows the transition of the internal state of the instruction selection unit 122 of this embodiment. Table 19 shows the outputted values of the instruction selection unit 122. The meanings of S[t] m R, D[n], and V[k] on the tables are the same as those of Embodiment 22.

TABLE 18

| S[t] | B[m~m + 2] | R | S[t + 1] | Y[m~m + 2][t + 1] |
|---|---|---|---|---|
| m | *, *, * | 0 | S[t] | Y[m], Y[m + 1], Y[m + 2] |
| m | 2, *, * | 1 | m + 1 | y[m], Y[m + 1], Y[m + 2] |
| m | x, 2, * | 1 | m + 2 | Y[m], y[m + 1], Y[m + 2] |
| m | x, x, 2 | 1 | m | Y[m], Y[m + 1], y[m + 2] |
| m | 1, x, x | 1 | m + 1 | 0, Y[m + 1], Y[m + 2] |
| m | 0, 1, x | 1 | m + 2 | 0, 0, Y[m + 2] |
| m | 0, 0, 1 | 1 | m | 0, 0, 0 |
| m | 0, 0, 0 | 1 | m | 0, 0, 0 |
| m | 2, 2, * | 2 | m + 2 | y[m], y[m + 1], Y[m + 2] |
| m | 2, x, 2 | 2 | m | y[m], Y[m + 1], y[m + 2] |
| m | 2, x, x | 2 | m + 1 | 0, Y[m + 1], Y[m + 2] |
| m | x, 2, 2 | 2 | m | Y[m], y[m + 1], Y[m + 2] |
| m | 1, 2, x | 2 | m + 1 | 0, y[m + 1], Y[m + 2] |
| m | 1, 1, 2 | 2 | m + 1 | 0, Y[m + 1], y[m + 2] |
| m | 1, 1, x | 2 | m + 2 | 0, 0, Y[m + 2] |
| m | 1, 0, 2 | 2 | m + 1 | 0, 0, y[m + 2] |
| m | 1, 0, 1 | 2 | m | 0, 0, 0 |
| m | 1, 0, 0 | 2 | m + 1 | 0, 0, 0 |
| m | 0, 2, x | 2 | m + 2 | 0, 0, Y[m + 2] |
| m | 0, 1, 2 | 2 | m + 2 | 0, 0, y[m + 2] |
| m | 0, 1, 1 | 2 | m | 0, 0, 0 |
| m | 0, 1, 0 | 2 | m + 2 | 0, 0, 0 |
| m | 0, 0, 2 | 2 | m | 0, 0, 0 |
| m | 0, 0, 1 | 2 | m | 0, 0, 0 |
| m | 0, 0, 0 | 2 | m | 0, 0, 0 |

TABLE 19

| S[t] | B[m~m + 2] | R | D[n~n + 5] | V[0], V[1] |
|---|---|---|---|---|
| m | *, *, * | 0 | e[n], e[n + 1], e[n + 2], e[n + 3], e[n + 4], e[n + 5] | = |
| m | 2, *, * | 1 | y[n], Y[n + 1], e[n + 2], e[n + 3], e[n + 4], e[n + 5] | G[m] |
| m | x, 2, * | 1 | e[n], e[n + 1], y[n + 2], Y[n + 3], e[n + 4], e[n + 5] | G[m + 1] |
| m | x, x, 2 | 1 | e[n], e[n + 1], e[n + 2], e[n + 3], y[n + 4], Y[n + 5] | G[m + 2] |
| m | 1, x, x | 1 | 1, 1, e[n + 2], e[n + 3], e[n + 4], e[n + 5] | G[m] |
| m | 0, 1, x | 1 | 1, 1, 1, 1, e[n + 4], e[n + 5] | G[m + 1] |
| m | 0, 0, 1 | 1 | 1, 1, 1, 1, 1, 1 | G[m + 2] |
| m | 0, 0, 0 | 1 | 1, 1, 1, 1, 1, 1 | = |
| m | 2, 2, * | 2 | y[n], Y[n + 1], y[n + 2], Y]n + 3], e[n + 4], e[n + 5] | G[m], G[m + 1] |
| m | 2, x, 2 | 2 | y[n], Y[n + 1], e[n + 2], e[n + 3], y[n + 4], Y[n + 5] | G[m], G[m + 2] |
| m | 2, x, x | 2 | 1, 1, e[n + 2], e[n + 3], e[n + 4], e[n + 5] | C[n], C[n + 1] |
| m | x, 2, 2 | 2 | e[n], e[n + 1], y[n + 2], Y]n + 3], y[n + 4], Y[n + 5] | G[m + 1], G[m + 2] |
| m | 1, 2, x | 2 | 1, 1, y[n + 2], Y]n + 3], e[n + 4], e[n + 5] | G[m], G[m + 1] |
| m | 1, 1, 2 | 2 | 1, 1, e[n + 2], e[n + 3], y[n + 4], Y[n + 5] | G[m], G[m + 2] |
| m | 1, 1, x | 2 | 1, 1, 1, 1, e[n + 4], e[n + 5] | G[m], G[m + 1] |
| m | 1, 0, 2 | 2 | 1, 1, 1, 1, y[n + 4], Y[n + 5] | G[m], G[m + 2] |
| m | 1, 0, 1 | 2 | 1, 1, 1, 1, 1, 1 | G[m], G[m + 2] |
| m | 1, 0, 0 | 2 | 1, 1, 1, 1, 1, 1 | G[m] |
| m | 0, 2, x | 2 | 1, 1, 1, 1, e[n + 4], e[n + 5] | C[n + 2], C[n + 3] |
| m | 0, 1, 2 | 2 | 1, 1, 1, 1, y[n + 4], Y[n + 5] | G[m + 1], G[m + 2] |
| m | 0, 1, 1 | 2 | 1, 1, 1, 1, 1, 1 | G[m + 1], G[m + 2] |
| m | 0, 1, 0 | 2 | 1, 1, 1, 1, 1, 1 | G[m + 1] |
| m | 0, 0, 2 | 2 | 1, 1, 1, 1, 1, 1 | C[n + 4], C[n + 5] |
| m | 0, 0, 1 | 2 | 1, 1, 1, 1, 1, 1 | G[m + 2] |
| m | 0, 0, 0 | 2 | 1, 1, 1, 1, 1, 1 | = |

In this embodiment, Y[m][t] which is the state related with the instruction input group of No. m in the cycle t, is provided as the internal state besides S[t] corresponding to each instruction input group. Y[n][t] is noted as Y[m] in Tables 18 and 19. y[m] means logical denial of Y[m]. B[m~m+2] represents the combination of B[m], B[m+1], and B[m+2]. Here, m+k means addition in the system of residues having 3 as modulo. The symbol "*" in the column of B[m~m+2] on Tables 18 and 19 means it can be any of 0, 1, and 2. The symbol "x" means it can be either 0 or 1. B[m] and G[m] are for convenience. Table 20 shows the correspondence between B[m] and E[n] or E[n+1], and between G[m] and C[n] or C[n+1].

TABLE 20

| E[n] | E[n+1] | Y[m] | B[m] | G[m] |
|------|--------|------|------|--------|
| 0 | 0 | 0 | 0 | = |
| 0 | 0 | 1 |   |   |
| 0 | 1 | 0 |   |   |
| 0 | 1 | 1 | 1 | C[n + 1] |
| 1 | 0 | 0 | 1 | C[n] |
| 1 | 0 | 1 |   |   |
| 1 | 1 | 0 | 2 | C[n] |
| 1 | 1 | 1 | 2 | C[n + 1] |

In this table, $n = m \times 2$. B[m] represents the number of inputted instructions by the instruction input group of No. m.

Y[m] memorizes the instruction cited as the selecting candidate in the instruction input group of No. n is which of C[n] and C[n+1]. G[m] represents the instruction cited as the selecting candidate by Y[m]. C[n] is cited as the candidate when Y[m] is 0, and C[n+1] is cited when Y[m] is 1.

The reason that Y[m] is provided as the internal state is as follows.

When either one of the instructions inputted to the instruction input units 121 of No. n and No. n+1, followed by successive instructions, is selected, the other instruction is avoided to be kept waiting long. Y[m] is reset to 0 as shown on Table 18, when either one of the instruction input units 121 of No. n and No. n+1 is inputted an instruction, and the instruction is selected in the instruction selection unit 122. This is because the instruction supplier of outside of the instruction scheduler of this embodiment is assumed to supply instructions to the unit 121 of No. n, when both units of No. n and No. n+1 have vacancy. Therefore, the blank lines in the column of B[m] and G[m] mean that the combination of E[n], E[n+1], and Y[m] does not exist.

The instruction selecting method shown in Tables 8 and 19 is based on the following idea.

Beginning from the instruction input group that the internal state S[t] memorizes, the instruction of the group that has the largest number of inputted instructions is selected and it is outputted from the instruction output units 123. Next, beginning from the next group, this is repeated until there is no capacity left to output or all the inputted instructions are outputted.

According to this embodiment, like Embodiment 22, instructions can be fairly selected taking the inputting request of instructions from the instruction input units into consideration.

The instruction schedulers of Embodiment 22 and 23 can be modified based on the purposes, which are not excepted from this invention. Especially, the case that (L, W, F) is (3,2, 2) is described in each embodiment, however, L , W, and F may be set independently.

<Embodiment 24>

Figure 17:
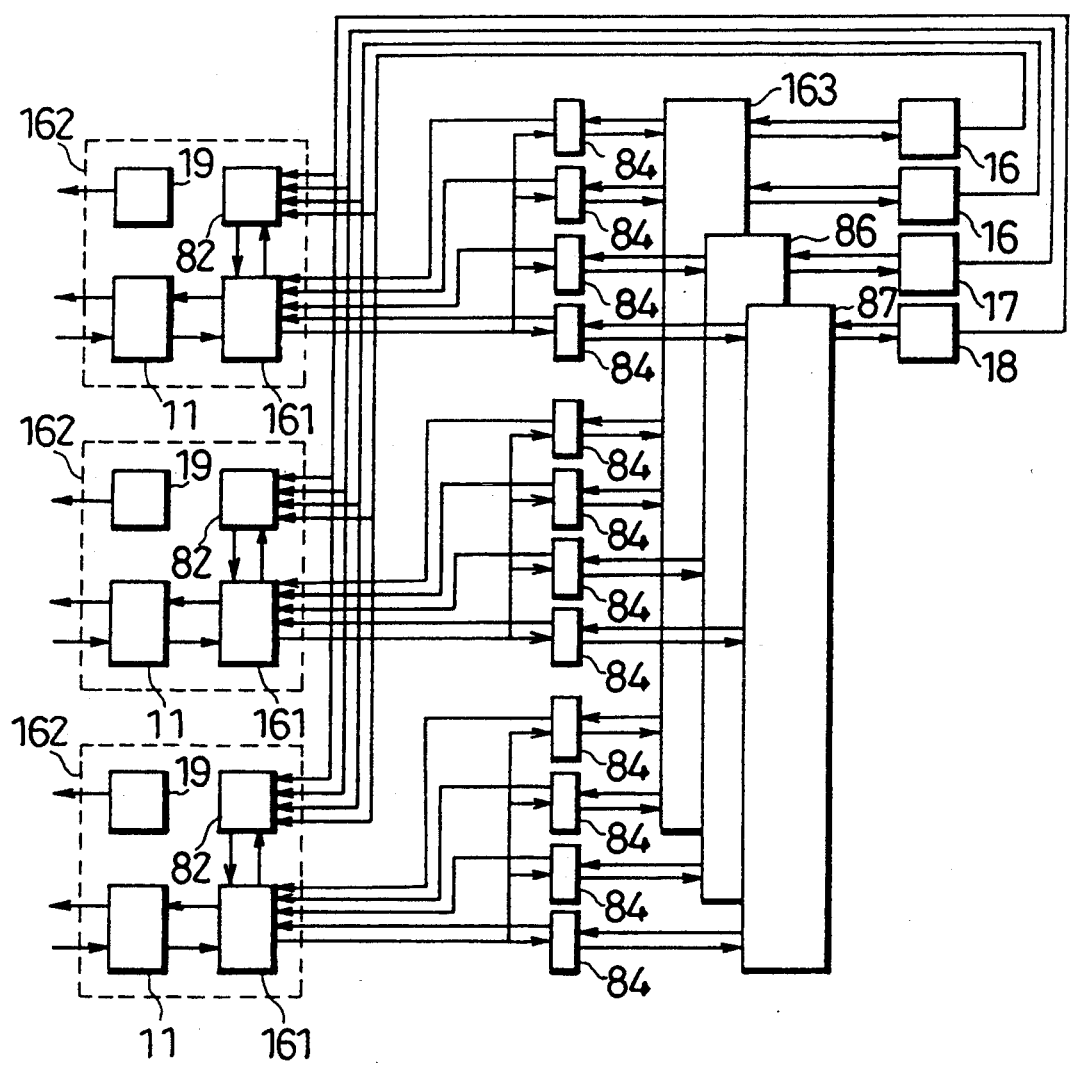
FIG. 17 shows the construction of yet another embodiment of the information processor of the present invention.

In FIG. 17 showing the construction of the information processor of this embodiment, there are program counters 19, instruction fetch units 11, decode units 161, dependency analysis units 82, instruction stand-by units 84, instruction schedule units 86, 87, and 163, and function execution units 16–18. Each portion 162 is referred to as an instruction setup unit comprising a set of the instruction fetch unit 11, the decode unit 161, the dependency analysis unit 82, and the program counter 19. In this embodiment, the information described in FIG. 9 is modified as follows.

First, each instruction setup unit is provided with two instruction stand-by units 84 for integer operation. Next, the instruction schedule units 85 for integer operation is replaced by the instruction scheduler of Embodiment 23. Each of the instruction output units 123 is connected with each of the function execution units 16. The connection between the instruction scheduler and the instruction stand-by units 84 is as follows. Two of the instruction stand-by units for integer operation connected with the instruction setup unit of No. m are numbered $m \times 2$ and $m \times 2 + 1$. Here, the unit 84 to which the decode unit 161 outputs the instruction when both of the units 84 are vacant is numbered $m \times 2$. Thus, the instruction setup unit 84 of No. k is connected with the instruction input unit 121 of No. k. The instruction stand-by units 84 connected with the same instruction setup unit 162 become the instruction supplier of the same instruction input group in the instruction scheduler of the invention of the claim 14.

According to this embodiment, instructions outputted from each instruction setup unit can be fairly sent to the function execution units to be executed taking the numbers of instructions into consideration, by employing the instruction scheduler of the Embodiment 23 instead of some of the instruction schedule units of the information processor shown in FIG. 9. Especially the instruction scheduler shown in Embodiment 23 can prevent interlocks in pipelines in as many instruction setup units as possible because it gives the highest priority to the group having the largest number of instructions among the instruction input groups, and selects instructions inputted to such groups one by one. In this embodiment, the instruction scheduler of Embodiment 23 is used only for the instruction schedule units for integer operation, however, it is used for any instruction schedule units. It is effective to be used for the ones for integer operation, floating-point operation, and the like.

<Embodiment 25>

This embodiment has the construction shown in FIG. 10 except that its instruction schedule unit 95 for integer operation is replaced by the instruction scheduler of Embodiment 22. Here, each of the instruction input units 121 and each of the instruction stand-by units 94 are connected and each of the instruction output units 123 and each of the function execution units 16 are connected.

More precisely, the connection between the instruction input units 121 and the instruction stand-by units 94 is carried out as follows.

First, the instruction stand-by units 94 for integer operation are numbered. Two of the units 94 holding instructions of integer operation outputted from the instruction setup units 93 of No. m (m=0, 1, 2) are assigned $2 \times m$ and $2 \times m + 1$ as their numbers. Next, the instruction stand-by unit 94 numbered No. k is connected with the instruction input unit 121 numbered No. k.

According to this embodiment, instructions outputted from each instruction setup unit can be fairly sent to the function execution units to be executed.

In this embodiment, only the unit 95 for integer operation among the multiple instruction schedule units above mentioned are replaced by the instruction scheduler of Embodiment 22, however, any other schedule units can be replaced. It is effective that the ones for integer operation, floating-point operation, and the like are replaced.

<Embodiment 26>

The construction of the instruction scheduler of this embodiment is described with reference to FIG. 13 and Table 21 as follows. The instruction scheduler has P instruction input units 121 from No. 0 to No. P−1, and F instruction output units from No. 0 to No. F−1.

Table 21 shows the operation of the instruction selection unit 122 when P and F are respectively three and one.

TABLE 21

| S[t] | H[t] | E[0] | E[1] | E[2] | R | S[t + 1] | H[t + 1] | D[0] | D[1] | D[2] | V |
|------|------|------|------|------|---|----------|----------|------|------|------|---|
| *    | *    | 0    | 0    | 0    | * | S[t]     | H[t]     | 1    | 1    | 1    | = |
| 0    | x    | 1    | *    | *    | 1 | 0        | H[t] + 1 | 1    | e[1] | e[2] | C[0] |
| 0    | 3    | 1    | 1    | *    | 1 | 1        | 0        | 1    | 0    | e[2] | C[0] |
| 0    | 3    | 1    | 0    | 1    | 1 | 2        | 0        | 1    | 1    | 0    | C[0] |
| 0    | 3    | 1    | 0    | 0    | 1 | 0        | 0        | 1    | 1    | 1    | C[0] |
| 0    | *    | 0    | 1    | *    | 1 | 1        | 1        | 1    | 1    | e[2] | C[1] |
| 0    | *    | 0    | 0    | 1    | 1 | 2        | 1        | 1    | 1    | 1    | C[0] |
| 0    | *    | 1    | *    | *    | 0 | 0        | H[t]     | 0    | e[1] | e[2] | = |
| 0    | *    | 0    | 1    | *    | 0 | 1        | 0        | 1    | 0    | e[2] | = |
| 0    | *    | 0    | 0    | 1    | 0 | 2        | 0        | 1    | 1    | 0    | = |
| 1    | x    | *    | 1    | *    | 1 | 1        | H[t] + 1 | e[0] | 1    | e[2] | C[1] |
| 1    | 3    | *    | 1    | 1    | 1 | 2        | 0        | e[0] | 1    | 0    | C[1] |
| 1    | 3    | 1    | 1    | 0    | 1 | 0        | 0        | 0    | 1    | 1    | C[1] |
| 1    | 3    | 0    | 1    | 0    | 1 | 1        | 0        | 1    | 1    | 1    | C[1] |
| 1    | *    | *    | 0    | 1    | 1 | 2        | 1        | e[0] | 1    | 1    | C[2] |
| 1    | *    | 1    | 0    | 0    | 1 | 0        | 1        | 1    | 1    | 1    | C[0] |
| 1    | *    | *    | 1    | *    | 0 | 1        | H[t]     | e[0] | 0    | e[2] | = |
| 1    | *    | *    | 0    | 1    | 0 | 2        | 0        | e[0] | 1    | 0    | = |
| 1    | *    | 1    | 0    | 0    | 0 | 0        | 0        | 0    | 1    | 1    | = |
| 2    | x    | *    | *    | 1    | 1 | 2        | H[t] + 1 | e[0] | e[1] | 1    | C[2] |
| 2    | 3    | 1    | *    | 1    | 1 | 0        | 0        | 0    | e[1] | 1    | C[2] |
| 2    | 3    | 0    | 1    | 1    | 1 | 1        | 0        | 1    | 1    | 0    | C[2] |
| 2    | 3    | 0    | 0    | 1    | 1 | 2        | 0        | 1    | 1    | 1    | C[2] |
| 2    | *    | 1    | *    | 0    | 1 | 0        | 1        | 1    | e[1] | 1    | C[0] |
| 2    | *    | 0    | 1    | 0    | 1 | 1        | 1        | 1    | 1    | 1    | C[1] |
| 2    | *    | *    | *    | 1    | 0 | 2        | H[t]     | e[0] | e[1] | 0    | = |
| 2    | *    | 1    | 0    | 0    | 0 | 0        | 0        | 0    | e[1] | 1    | = |
| 2    | *    | 0    | 1    | 0    | 0 | 1        | 0        | 1    | 0    | 1    | = |

The meanings of the symbols on this table is the same as those on Table 13. Table 21 has H[t] as the internal state besides S[t], both of which represent the state in the cycle t. S[t] indicates the instruction input unit 121 with the priority in instruction selection. In contrast, H[t] indicates the instructions of the unit 121 selected successively. In this embodiment, the maximum of such instructions is four. Therefore, H[t] takes one of four states: 0, 1, 2, and 3. The symbol "x" in the column of H[t] indicates it can be any of 0, 1, and 2. The symbol "*" indicates it can be any of 0, 1, 2, and 3. The instruction selection unit 122 of the instruction scheduler of this embodiment first checks whether the instruction input unit 121 which is memorized as internal state S[t] is inputted instructions or not. If it is, the unit 122 selects them, and finds the number of instructions selected successively and memorized as the internal state H[t]. When the number including the one selected in the current cycle is four, the unit 122 changes the internal state S[t] and gives the priority to another instruction input unit 121 in current use. On the other hand, instructions are not inputted in the unit 121, the unit 122 gives the priority to another unit 121, and selects the instruction. The transfer of the priority among the units 121 is carried out in a certain order.

According to this embodiment, the number of instructions selected in one cycle is made one, however, it can be more than two by repeating the operation of the instruction selection unit 122 until all the instructions to be selected are outputted or no capacity is left to output instructions.

According to this embodiment, successively inputted instructions into an instruction input unit can scheduled to some extent when such an operation is effective, which allows impartial schedule of instructions among instruction input units by providing three instruction input units, one instruction output unit, and instruction selection unit which gives priorities of instruction selection to the three instruction input units setting the maximum number of successively selected instructions when multiple instructions inputted successively are selected as an unit.

The instruction schedulers of this embodiment can be modified based on the purposes, which are not excepted from this invention. Especially, the case that (P, F) is (3, 1) is described in this embodiment, however, P and F may be set independently, which are not excepted from this invention.

<Embodiment 27>

This embodiment has the construction shown in FIG. 9 except that its instruction schedule unit 87 for load/store is replaced by the instruction scheduler of Embodiment 26. Here, each of the instruction input units 121 and each of the instruction stand-by units 84 are connected and each of the instruction output units 123 and each of the function execution units 17 are connected.

According to this embodiment, by employing the instruction scheduler of Embodiment 26 as the instruction schedule unit for load/store of the information processor shown in FIG. 9, instructions outputted from each instruction setup unit can be fairly sent to the function execution unit and instructions can be scheduled taking the locality of memory access into consideration in instruction execution.

In this embodiment, the unit 87 is replaced by the instruction scheduler of Embodiment 26, however, any other schedule units can be replaced.

<Embodiment 28>

This embodiment has the construction shown in FIG. 10 except that its instruction schedule unit 87 for load/store is replaced by the instruction scheduler of Embodiment 26. The effects by the replacement are omitted because they are the same as those of Embodiment 27.

In this embodiment, the unit 87 is replaced by the instruction scheduler of Embodiment 26, however, any other schedule units can be replaced.

<Embodiment 29>

The construction of the instruction scheduler of this invention, which is not illustrated, is different from those described in Embodiments 15 and 22 and has a distinctive instruction scheduling as follows. Instructions are scheduled on the fixed-priority basis at each point of instruction scheduling, however, the priorities assigned to each input unit are rotated in every unit of time. For example, when three instruction streams of A, B, and C are executed in parallel, priorities of high, medium, and low are respectively given to A, B, and C in the order from the starting point of execution to a certain cycle (for example, 8th cycle), and after this point, the priorities of high, medium, and low are given to B, C, and A. The priorities are shifted at the next execution cycle ($8 \times 2 = 16$th cycle). The stream which had the highest priority gets the lowest, and the others get higher than before. Such a scheduling having regulations can be easily carried out as hardware and has an advantage of diminishing the size of the hardware a little compared with the one of Embodiment 15.

Although the present invention has been fully described by way of examples with reference to the accompanying drawings, it is be noted that various changes and modifications will be apparent to those skilled in the art. Therefore, unless otherwise such changes and modifications depart from the scope of the present invention, they should be construed as being included therein.

What is claimed is:

1. An information processor for processing instructions of a plurality of instruction streams in parallel, comprising:
    (1) a plurality of instruction setup apparatuses simultaneously receiving the instructions of the plurality of instruction streams, each instruction setup apparatus having
        (a) means for reading instructions from one of the plurality of instruction streams,
        (b) decoding means for decoding the instructions read by the reading means to provide decoded instructions,
        (c) means for receiving data dependency information,
        (d) dependency analysis means for determining whether or not the decoded instructions may be output based on the data dependency information, and
        (e) means for outputting the decoded instructions when the dependency analysis means determines that the instructions may be output;
    (2) a plurality of function execution apparatuses, each function execution apparatus having
        (a) means for receiving issued instructions,
        (b) means for executing the issued instructions, and
        (c) means for outputting the data dependency information to the plurality of instruction setup apparatuses; and
    (3) an instruction schedule apparatus connected between the instruction setup apparatuses and the function execution apparatuses, the instruction schedule apparatus having
        (a) means for simultaneously receiving the decoded instructions output by the plurality of instruction setup apparatuses,
        (b) means for determining when individual ones of the plurality of function execution apparatuses are capable of receiving the issued instructions,
        (c) means for selecting issuable instructions from among the decoded instructions, issuable instructions being decoded instructions that are to be issued to corresponding function execution apparatuses that are capable of receiving the issued instructions, and
        (d) means for issuing the selected issuable instructions to each corresponding function execution apparatus.

2. The information processor of claim 1, wherein the reading means of each of the instruction setup apparatuses comprises:
    an instruction fetch means dedicated to a given instruction setup apparatus for reading instructions from a given one of the plurality of instruction streams,
    each of the instruction fetch means reading instructions from a different one of the plurality of instruction streams in parallel in a reading cycle.

3. The information processor of claim 2 wherein the dependency analysis means comprises a means for storing the data dependency information received from the function execution units.

4. The information processor of claim 3, wherein
    the instruction setup apparatuses output
        first information to the instruction schedule apparatus, the first information being an operational directive containing detailed directions for operation of a function execution apparatus, and
        second information indicating to which function execution apparatus the first information is sent;
    the instruction schedule apparatus outputs
        third information to the instruction setup apparatuses indicating whether or not it is capable of receiving a next operational directive;
    the function execution apparatuses output
        fourth information to the instruction schedule apparatus indicating whether or not the function execution apparatuses are capable of receiving new instructions; and
    the instruction schedule apparatus outputs
        fifth information to the function execution apparatuses corresponding to the operational directive.

5. The information processor of claim 4,
    wherein the third information is output a half cycle earlier the first and second information,
    and wherein the decoding means judges, based on the third information, whether to send the instruction schedule apparatus
    a new set of first and second information corresponding to the next operational directive or to repeat the first and second information corresponding to the operational directive outputted in the previous cycle.

6. The information processor of claim 5, wherein the plurality of instruction setup apparatuses are individually numbered for identification, wherein the identification number of a particular instruction setup apparatus is included in the operation directive of the first and fifth information, and wherein the function execution apparatuses report an elimination of dependencies among instructions to the dependency analysis means of the instruction setup apparatuses using the identification numbers thereby advising the instruction setup apparatuses of an availability of registers which hold data to be processed in the function execution apparatuses.

7. The information processor of claim 6, wherein the storing means of the dependency analysis means stores availability data for each register accessed by each function execution apparatus, the availability data indicating whether a register is "usable" or "reserved" and wherein the dependency analysis means further comprises:

means for enabling the decoding means to output a decoded instruction which uses a particular register by changing the availability status of the particular register to "usable" when the elimination of the dependency is reported from the function execution apparatuses before the instruction is issued, and means for inhibiting the dependency analysis means of other instruction setup apparatuses from issuing an instruction which uses the particular register by changing the availability status of the particular register to "reserved" after the instruction is issued.

8. The information processor of claim 7, wherein the instruction schedule apparatus schedules instruction execution on a fixed-priority basis when there is a resource conflict among the decoded instructions received from the instruction setup apparatuses.

9. The information processor of claim 7, wherein the decoding means of each of the plurality of instruction setup apparatuses receives a plurality of instructions at one time from the instruction fetch means, finds up to a predetermined number of instructions capable of being executed in parallel among the plurality of instructions, outputs the instructions capable of being executed to the instruction schedule unit, and holds non-issuable instructions until they become issuable, the instruction schedule apparatus having a number of input ports equal to the predetermined number.

10. The information processor of claim 9, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

11. The information processor of claim 7, wherein the instruction schedule apparatus comprises:

a plurality of instruction storing means for storing instructions to be sent to the function execution apparatuses, the plurality of instruction storing means corresponding one for one to the function execution apparatuses, the instruction storing means outputting stored instructions to corresponding function execution apparatuses in order and outputting a space available signal when there is room to store further instructions therein; and an instruction collecting means for receiving the decoded instructions from the instruction setup apparatuses and providing the decoded instructions to the plurality of instruction storing means which have room to store in response to the space available signal.

12. The information processor of claim 11, wherein the decoding means of each of the plurality of instruction setup apparatuses receives a plurality of instructions at one time from the instruction fetch means, finds up to a predetermined number of instructions capable of being executed in parallel among the plurality of instructions, outputs the instructions capable of being executed to the instruction schedule apparatus, and holds non-issuable instructions until they become issuable, the instruction collecting means and the instruction storing means having a plurality of input ports equal to the predetermined number so that both of the means can collect and store the predetermined number of instructions.

13. The information processor of claim 12, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

14. The information processor of claim 11 wherein the space available signal informs the instruction collecting means of the number of instructions stored in the instruction storing means.

15. The information processor of claim 11 wherein the space available signal informs the instruction collecting means of how many more instructions can be stored in the instructions storing means.

16. The information processor of claim 7, wherein the instruction schedule apparatus is divided into a plurality of divided instruction schedule apparatuses according to a type of the function execution apparatuses, each of the divided instruction schedule apparatuses having an instruction storing means, the decoding means of each of the instruction setup apparatuses outputting the decoded instructions to the storing means of the divided instruction schedule apparatuses corresponding to the type of function execution apparatus to execute the decoded instructions when the storing means is capable of receiving instructions, and each of the divided instruction schedule apparatus outputting instructions when the corresponding function execution apparatus can execute the instructions.

17. The information processor of claim 16, wherein the decoding means of the instruction setup apparatuses receives a plurality of instructions at one time from the instruction fetch means, finds up to a predetermined number of instructions capable of being executed in parallel among the plurality of instructions, and outputs the instructions capable of being executed in parallel to the instruction storing units, the instruction storing units having a number of input ports equal to the predetermined number.

18. The information processor of claim 17, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

19. The information processor of claim 2 further comprising:

at least two instruction stand-by apparatuses provided to each of the decoding means for temporarily storing instructions outputted therefrom, the at least two instruction stand-by apparatuses informing the decoding means whether or not the at least two instruction stand-by apparatuses are vacant;

wherein the decoding means outputs decoded instructions to the stand-by apparatuses which are vacant for temporary storing, and the instruction schedule apparatus thereafter schedules the decoded instructions temporarily stored in the instruction stand-by units.

20. The information processor of claim 19, wherein the decoding means of the instruction setup apparatuses output first information being an operational directive containing detailed directions for operation of a function execution apparatus, second information indicating to which function execution apparatus the first information is sent, and supplementary information indicating whether or not the first and second information should be stored in the instruction stand-by units;

the instruction schedule apparatus outputs third information to the decoding means and to the instruction stand-by units indicating whether or not it is capable of receiving a next operational directive; the function execution apparatuses output fourth information to the instruction schedule apparatuses indicating whether or not the function execution apparatuses are capable of receiving new instructions; and the instruction schedule apparatus outputs fifth information to the function execution apparatuses corresponding to the operational directive.

21. The information processor of claim 20, wherein the instruction stand-by apparatuses operate synchronously with the decoding means, and are staggered by a half cycle with respect to the instruction schedule apparatus.

22. The information processor of claim 21, wherein the instruction stand-by apparatuses comprise one of a D flip-flop type device and a latch type memory device.

23. The information processor of claim 22, wherein the decoding means of each of the instruction setup apparatuses receives a plurality of instructions at one time from the instruction fetch means, finds up to a predetermined number of instructions capable of being executed in parallel among the plurality of instructions, outputs the instructions capable of being executed in parallel to the instruction schedule unit, and holds instructions when they are not issuable and there is no vacant instruction stand-by apparatus, the instruction stand-by apparatuses provided in a quantity and the instruction schedule unit apparatus having a number of input ports exceeding the predetermined number.

24. The information processor of claim 23, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

25. The information processor of claim 24, wherein the instruction stand-by apparatuses and the instruction schedule apparatuses are divided depending on a type of the function execution apparatuses, the decoding means of each of the instruction setup apparatuses outputting decoded instructions to the instruction stand-by apparatuses corresponding to the types thereof, and each of the instruction schedule apparatuses receiving the instructions from the instruction stand-by apparatuses and outputting them to the corresponding function execution apparatuses.

26. The information processor of claim 25, wherein the decoding means of the instruction setup apparatuses receives a plurality of instructions at one time from the instruction fetch means, finds up to a predetermined number of instructions capable of being executed in parallel among the plurality of instructions, outputs the instructions capable of being executed in parallel to the instruction schedule apparatus, and holds instructions when they are not issuable and there is no vacant instruction stand-by unit, the instruction stand-by apparatuses provided in a quantity and the instruction schedule unit apparatus having a number of input ports exceeding the predetermined number.

27. The information processor of claim 24, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

28. An information processor of claim 1, wherein the reading means of each of the instruction setup apparatuses comprises one instruction fetch means the instruction fetch means being shared among all of the instruction setup apparatuses and reading a plurality of instructions at one time from a single instruction stream in one reading cycle to send the plurality of instructions to one of the instruction setup apparatuses, the instruction fetch means repeating this fetching operation in an interleaved fashion for all of the instruction setup apparatuses to send instructions of different instruction streams to the instruction setup apparatuses to corresponding instruction setup apparatuses using a common instruction fetch means.

29. The information processor of claim 28 wherein the dependency analysis means comprises a means for storing the data dependency information received from the function execution units.

30. The information processor of claim 29, wherein each instruction setup apparatus includes a queue of the plurality of instructions fetched at the one time by the instruction fetch means.

31. The information processor of claim 30, wherein the instruction setup apparatuses output first information to the instruction schedule apparatus, the first information being an operational directive containing detailed directions for operation of a function execution apparatus, and second information indicating to which function execution apparatus the first information is sent; the instruction schedule apparatus outputs third information to the instruction setup apparatuses indicating whether or not it is capable of receiving a next operational directive;

the function execution apparatuses output fourth information to the instruction schedule apparatus indicating whether or not the function execution apparatuses are capable of receiving new instructions; and the instruction schedule apparatus outputs fifth information to the function execution apparatuses corresponding to the operational directive.

32. The information processor of claim 31,
wherein the third information is output a half cycle earlier the first and second information,
and wherein the decoding means judges whether to send the instruction schedule apparatus new set of first and second information corresponding to the next operational directive or to repeat the first and second information corresponding to the operational directive outputted in the previous cycle.

33. The information processor of claim 32,
wherein the plurality of instruction setup apparatuses are individually numbered for identification,
wherein the identification number of a particular instruction setup apparatus is included in the operation directive of the first and fifth information, and
wherein the function execution apparatuses report an elimination of dependencies among instructions to the dependency analysis means of the instruction setup apparatuses using the identification numbers thereby advising the instruction setup apparatuses of an availability of registers which hold data to be processed in the function execution apparatuses.

34. The information processor of claim 33, wherein the storing means of the dependency analysis means stores availability data for each register accessed by each function execution apparatus, the availability data indicating whether a register is "usable" or "reserved" and wherein the dependency analysis means further comprises:
means for enabling the decoding means to output a decoded instruction which uses a particular register by changing the availability status of the particular register to "usable" when the elimination of the dependency is reported from the function execution apparatuses before the instruction is issued, and
means for inhibiting the dependency analysis means of other instruction setup apparatuses from issuing an instruction which uses the particular register by changing the availability status of the particular register to "reserved" after the instruction is issued.

35. The information processor of claim 34, wherein the instruction schedule apparatus schedules instruction execution on a fixed-priority basis when there is a resource conflict among the decoded instructions received from the instruction setup apparatuses.

36. The information processor of claim 34, wherein the decoding means of each of the plurality of instruction setup apparatuses receives a plurality of instructions at one time from the instruction fetch means, finds up to a predetermined number of instructions capable of being executed in parallel among the plurality of instructions, outputs the instructions capable of being executed to the instruction schedule unit, and holds non-issuable instructions until they become issuable, the instruction schedule apparatus having a number of input ports equal to the predetermined number.

37. The information processor of claim 36, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

38. The information processor of claim 34, wherein the instruction schedule apparatus comprises:

a plurality of instruction storing means for storing instructions to be sent to the function execution apparatuses, the plurality of instruction storing means corresponding one for one to the function execution apparatuses, the instruction storing means outputting stored instructions to corresponding function execution apparatuses in order and outputting a space available signal when there is room to store further instructions therein; and
an instruction collecting means for receiving the decoded instructions from the instruction setup apparatuses and providing the decoded instructions to the plurality of instruction storing means which have room to store in response to the space available signal.

39. The information processor of claim 38, wherein the decoding means of each of the plurality of instruction setup apparatuses receives a plurality of instructions at one time from the instruction fetch means, finds up to a predetermined number of instructions capable of being executed in parallel among the plurality of instructions, outputs the instructions capable of being executed to the instruction schedule apparatus, and holds non-issuable instructions until they become issuable, the instruction collecting means and the instruction storing means having a plurality of input ports equal to the predetermined number so that both of the means can collect and store the predetermined number of instructions.

40. The information processor of claim 39, wherein each of the input ports is assigned a fixed priority, and wherein the instruction schedule apparatus suspends input ports of lower priority when a number of instructions inputted from the instruction setup apparatuses is beyond a receiving capacity of the function execution apparatuses.

41. The information processor of claim 30, wherein the instruction schedule apparatus is divided into a plurality of divided instruction schedule apparatuses according to a type of the function execution apparatuses, each of the divided instruction schedule apparatuses having an instruction storing means, the decoding means of each of the instruction setup apparatuses outputting the decoded instructions to the storing means of the divided instruction schedule apparatuses corresponding to the type of function execution apparatus to execute the decoded instructions when the storing means is capable of receiving instructions, and each of the divided instruction schedule apparatus outputting instructions when the corresponding function execution apparatus can execute the instructions.

42. The information processor of claim 29 further comprising:
at least two instruction stand-by apparatuses provided to each of the decoding means for temporarily storing instructions outputted therefrom, the at least two instruction stand-by apparatuses informing the decoding means whether or not the at least two instruction stand-by apparatuses are vacant;
wherein the decoding means outputs decoded instructions to the stand-by apparatuses which are vacant for temporary storing, and
the instruction schedule apparatus thereafter schedules the decoded instructions temporarily stored in the instruction stand-by units.

43. The information processor of claim 42, wherein the decoding means of the instruction setup apparatuses output first information being an operational directive containing detailed directions for operation of a function execution apparatus, second information indicating to which function execution apparatus the first information is sent, and supplementary information indicating whether or not the first and second information should be stored in the instruction stand-by units;

the instruction schedule apparatus outputs third information to the decoding means and to the instruction stand-by units indicating whether or not it is capable of receiving a next operational directive; the function execution apparatuses output fourth information to the instruction schedule apparatuses indicating whether or not the function execution apparatuses are capable of receiving new instructions; and the instruction schedule apparatus outputs fifth information to the function execution apparatuses corresponding to the operational directive.

44. The information processor of claim 43, wherein the instruction stand-by apparatuses operate synchronously with the decoding means, and are staggered by a half cycle with respect to the instruction schedule apparatus.

45. The information processor of claim 44, wherein the decoding means of the instruction setup apparatuses receives a plurality of instructions at one time from the instruction fetch means, finds up to a predetermined number of instructions capable of being executed in parallel among the plurality of instructions, outputs the instructions capable of being executed in parallel to the instruction schedule apparatus, and holds instructions when they are not issuable and there is no vacant instruction stand-by unit, the instruction stand-by apparatuses provided in a quantity and the instruction schedule unit apparatus having a number of input ports exceeding the predetermined number.

46. The information processor of claim 43, wherein the instruction stand-by apparatuses and the instruction schedule apparatuses are divided depending on a type of the function execution apparatuses, the decoding means of each of the instruction setup apparatuses outputting decoded instructions to the instruction stand-by apparatuses corresponding to the types thereof, and each of the instruction schedule apparatuses receiving the instructions from the instruction stand-by apparatuses and outputting them to the corresponding function execution apparatuses.

* * * * *